United States Patent
Matsumoto

(10) Patent No.: US 11,245,919 B2
(45) Date of Patent: Feb. 8, 2022

(54) IMAGE PROCESSING DEVICE AND IMAGE PROCESSING METHOD

(71) Applicant: SONY CORPORATION, Tokyo (JP)

(72) Inventor: Junichi Matsumoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/979,159

(22) PCT Filed: Dec. 4, 2018

(86) PCT No.: PCT/JP2018/044524
§ 371 (c)(1),
(2) Date: Sep. 8, 2020

(87) PCT Pub. No.: WO2019/176189
PCT Pub. Date: Sep. 19, 2019

(65) Prior Publication Data
US 2020/0404318 A1  Dec. 24, 2020

(30) Foreign Application Priority Data
Mar. 16, 2018 (JP) .............................. JP2018-049200

(51) Int. Cl.
*H04N 19/52* (2014.01)
*H04N 19/176* (2014.01)
(Continued)

(52) U.S. Cl.
CPC ........... *H04N 19/52* (2014.11); *H04N 19/176* (2014.11); *H04N 19/30* (2014.11); *H04N 19/61* (2014.11)

(58) Field of Classification Search
CPC ...... H04N 19/52; H04N 19/176; H04N 19/30; H04N 19/61
See application file for complete search history.

(56) References Cited

U.S. PATENT DOCUMENTS

| | | | | |
|---|---|---|---|---|
| 2010/0053325 | A1* | 3/2010 | Inagaki | G06T 3/0062 348/143 |
| 2015/0092851 | A1* | 4/2015 | Yoshikawa | H04N 19/42 375/240.13 |

(Continued)

FOREIGN PATENT DOCUMENTS

| | | |
|---|---|---|
| JP | 2008-193458 A | 8/2008 |
| JP | 2009-290889 A | 12/2009 |

(Continued)

OTHER PUBLICATIONS

International Search Report and Written Opinion of PCT Application No. PCT/JP2018/044524, dated Jan. 15, 2019, 09 pages of ISRWO.

*Primary Examiner* — Jonathan R Messmore
(74) *Attorney, Agent, or Firm* — Chip Law Group

(57) ABSTRACT

A motion vector correction unit including a correction method determination unit 40 and an inter-prediction unit 42 performs scaling processing on a motion vector of, for example, a peripheral block of a current predictive block in a fisheye image shot using a fisheye lens, on the basis of fisheye information, for example, a projection method of the fisheye lens and a radius of the fisheye image. The scaling processing performs scaling by transforming the motion vector of the peripheral block to a motion vector of an image having no fisheye distortion, and transforms the motion vector after the scaling to the motion vector in the fisheye image. By reducing a difference between a motion vector of the current predictive block and a predictive motion vector by performing the scaling processing, encoding efficiency of the fisheye image can be improved.

13 Claims, 17 Drawing Sheets

(51) Int. Cl.
*H04N 19/30* (2014.01)
*H04N 19/61* (2014.01)

(56) References Cited

U.S. PATENT DOCUMENTS

| | | | |
|---|---|---|---|
| 2017/0195685 A1* | 7/2017 | Chen | H04N 19/103 |
| 2017/0330337 A1* | 11/2017 | Mizutani | G06T 5/006 |
| 2017/0339392 A1* | 11/2017 | Forutanpour | H04N 19/597 |
| 2017/0345136 A1* | 11/2017 | Van der Auwera | G06T 5/006 |
| 2018/0075635 A1* | 3/2018 | Choi | H04N 5/23238 |
| 2018/0081178 A1* | 3/2018 | Shpunt | G06F 3/011 |
| 2018/0288435 A1* | 10/2018 | Boyce | H04N 19/176 |
| 2019/0356898 A1* | 11/2019 | Choi | H04N 13/139 |

FOREIGN PATENT DOCUMENTS

| | | | |
|---|---|---|---|
| JP | 2011-023885 A | 2/2011 | |
| JP | 2017-120980 A | 7/2017 | |
| JP | 2017-536002 A | 11/2017 | |

* cited by examiner

| PROJECTION METHOD | CORRECTION FACTOR |
|---|---|
| ORTHOGONAL PROJECTION | $1/\cos\theta$ |
| EQUIDISTANT PROJECTION | $\tan\theta/\theta$ |
| STEREOGRAPHIC PROJECTION | $\tan\theta/(2*\tan(\theta/2))$ |
| EQUISOLID ANGLE PROJECTION | $\tan\theta/(2*\sin(\theta/2))$ |

FIG. 3

IMAGE PROCESSING DEVICE AND IMAGE PROCESSING METHOD

CROSS REFERENCE TO RELATED APPLICATIONS

This application is a U.S. National Phase of International Patent Application No. PCT/JP2018/044524 filed on Dec. 4, 2018, which claims priority benefit of Japanese Patent Application No. JP 2018-049200 filed in the Japan Patent Office on Mar. 16, 2018. Each of the above-referenced applications is hereby incorporated herein by reference in its entirety.

TECHNICAL FIELD

The present technology relates to an image processing device and an image processing method.

BACKGROUND ART

In encoding/decoding processing of a fisheye image obtained by shooting using a fisheye lens, encoding/decoding processing can be achieved similar to an image (normal image) obtained by shooting using, for example, a normal lens whose angle of field is narrower than that of the fisheye lens. However, the fisheye image includes fisheye distortion, that is, distortion that increases as an object is farther from a center along a center direction. Therefore, in a case where inter-prediction is performed, for example, encoding efficiency deteriorates in comparison with the normal image. Accordingly, in PTL 1, the distortion of the fisheye image is corrected by a correction information generator, and then motion vectors are detected similar to the normal image.

CITATION LIST

Patent Literature

[PTL 1]
JP 2017-120980A

SUMMARY

Technical Problems

Meanwhile, the distortion correction processing performed by the correction information generator in PTL 1 does not take a characteristic formula unique to the lens into consideration. As a result, an error is produced in the distortion correction, in some cases. In addition, an error in the motion vector may be increased due to the error in the distortion correction. In a case where the angle of field is, for example, 180°, the error is expanded to infinity when the fisheye image is corrected so as to be the normal image. As a result, when a predetermined range in the fisheye image is transformed to the normal image to be encoded, an image excluding the predetermined range is not obtained upon decoding, thereby disabling reproduction of the fisheye image.

Then, an object of this technology is to provide an image processing device capable of performing encoding processing or decoding processing of a fisheye image with high encoding efficiency.

Solution to Problems

A first aspect of this technology is an image processing device including a motion vector correction unit that performs scaling processing on a motion vector used to calculate a predictive motion vector of a current predictive block in a fisheye image shot using a fisheye lens, on the basis of fisheye information regarding the fisheye lens and the fisheye image.

In this technology, the motion vector correction unit performs the scaling processing on a motion vector of, for example, a peripheral block of the current predictive block in the fisheye image shot using the fisheye lens, on the basis of the fisheye information, for example, a projection method of the fisheye lens and a radius of the fisheye image, and calculates the predictive motion vector using the motion vector after the scaling processing of the peripheral block. In the scaling processing, for example, scaling is performed by transforming the motion vector of the peripheral block in the fisheye image to a motion vector in an image having no fisheye distortion using a correction factor that corrects the fisheye distortion that varies according to a distance from a center of the fisheye lens and the radius of the fisheye image, and the motion vector after the scaling is transformed to the motion vector in the fisheye image. The correction factor is calculated, on the basis of a characteristic formula of the projection method of the fisheye lens and a characteristic formula of a central projection method for obtaining the image having no fisheye distortion. The calculated correction factor is normalized for each projection method of the fisheye lens as a table in advance to retain, and the scaling processing is performed using a correction factor table corresponding to the fisheye lens used to shoot from the retained correction factor tables.

The image processing device that encodes the fisheye image causes a lossless encoder to incorporate the fisheye information in an encoded stream of the fisheye image. The lossless encoder incorporates information indicating whether or not the scaling processing is performed, into the encoded stream. The fisheye information may include, for example, the projection method of the fisheye lens and the radius of the fisheye image, or may include information indicating a projection method of an optical image, instead of the radius of the fisheye image.

In the image processing device that decodes the encoded stream of the fisheye image, a motion vector correction unit performs the scaling processing on, for example, a motion vector of a peripheral block using the fisheye information obtained by decoding the encoded stream by a lossless decoder. Further, the motion vector correction unit performs the scaling processing using the fisheye information in a case where the information obtained by decoding the encoded stream by the lossless decoder indicates that the scaling processing is to be performed.

A second aspect of the technology is an image processing method including performing, by a motion vector correction unit, scaling processing on a motion vector used to calculate a predictive motion vector of a current predictive block in a fisheye image shot using a fisheye lens, on the basis of fisheye information regarding the fisheye lens and the fisheye image.

Advantageous Effects of Invention

According to this technology, a motion vector used to calculate a predictive motion vector of a current predictive block in a fisheye image shot using a fisheye lens is subjected to scaling processing, on the basis of fisheye information regarding the fisheye lens and the fisheye image. Therefore, encoding processing or decoding processing of the fisheye image can be performed with encoding efficiency higher than a case where the scaling processing is not performed. Note that effects described in the present specification are illustrative in nature, and are not limited. Additional effects may be provided.

BRIEF DESCRIPTION OF DRAWINGS

FIG. 3 is a table illustrating a correction factor for correcting a fisheye image to be a normal image for each projection method.

DESCRIPTION OF EMBODIMENT

Figure 1:
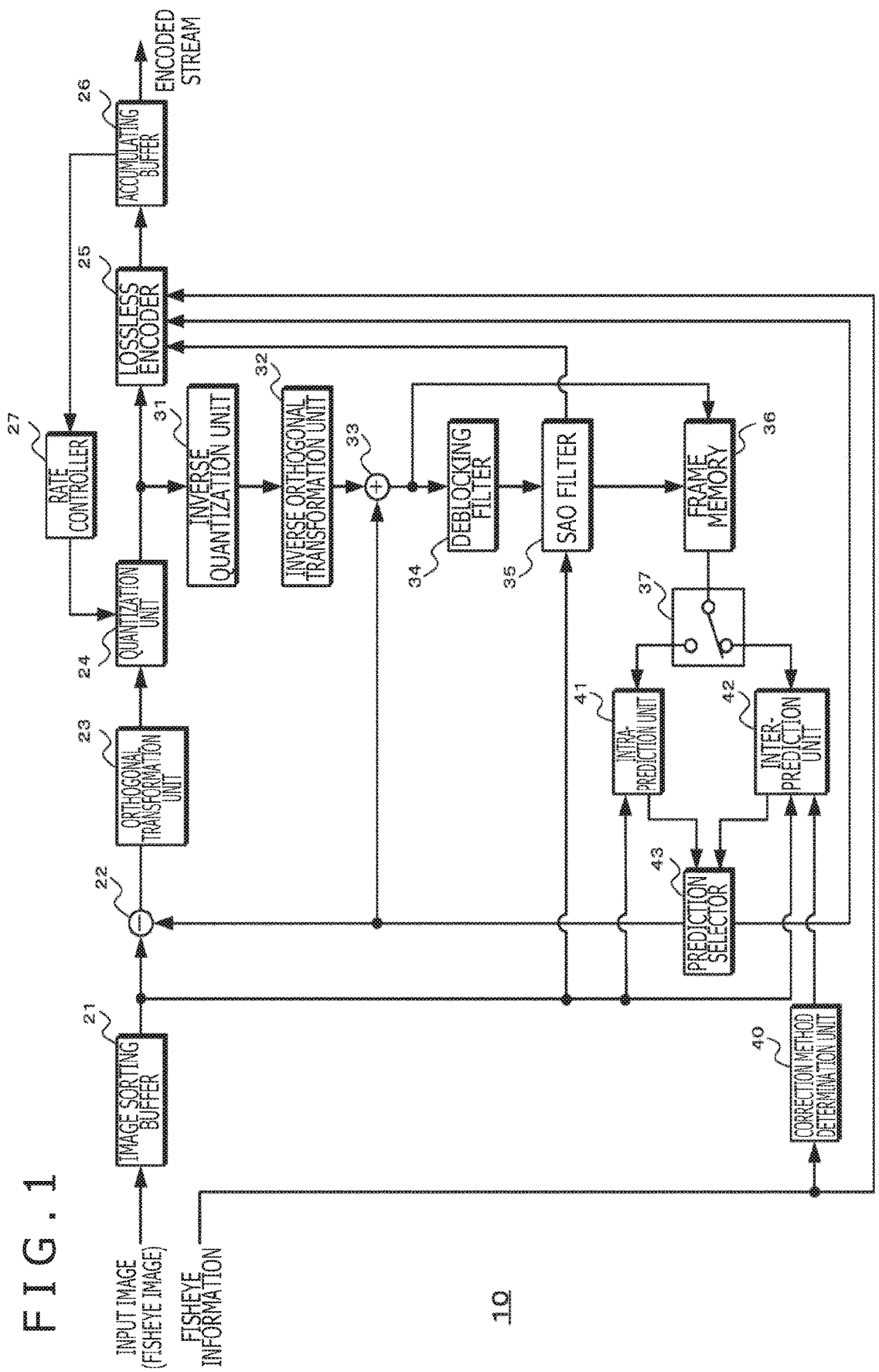
FIG. 1 is a diagram illustrating a configuration of an image encoding device.

Hereinafter, an exemplary embodiment of the present technology will be described. Note that the description will be made in the following order.

1. Regarding image processing device
2. Configuration of image encoding device
3. Operation of image encoding device
3-1. Regarding correction factor table
3-2. Regarding encoding processing operation
3-3. Regarding adaptive scaling of motion vector
4. Configuration of image decoding device
5. Operation of image decoding device
6. Another configuration of image processing device
7. Application examples 1. Regarding Image Processing Device An image processing device performs encoding processing of a moving image obtained by shooting using a fisheye lens (hereafter, also referred to as a "fisheye image"), or decoding processing of an encoded stream generated in the encoding processing. An image encoding device that performs the encoding processing performs scaling processing on a motion vector used to calculate a predictive motion vector of a current predictive block, on the basis of fisheye information regarding the fisheye lens used to obtain the fisheye image and the obtained fisheye image. This can improve encoding efficiency of the fisheye image by reducing a difference between a motion vector of the current predictive block and the predictive motion vector in comparison with a case where the scaling processing is not performed. Further, an image decoding device that performs the decoding processing on the encoded stream performs scaling processing using fisheye information obtained by decoding the encoded stream, and performs decoding processing using the motion vector after the scaling processing to generate a fisheye image.

2. Configuration of Image Encoding Device

FIG. 1 illustrates a configuration of the image encoding device that performs the encoding processing of the fisheye image. The image encoding device 10 encodes image data using prediction processing, and generates an encoded stream conforming to H.265/HEVC standards, for example.

The image encoding device 10 includes an image sorting buffer 21, an operator 22, an orthogonal transformation unit 23, a quantization unit 24, a lossless encoder 25, an accumulating buffer 26, and a rate controller 27. Further, the image encoding device 10 includes an inverse quantization unit 31, an inverse orthogonal transformation unit 32, an operator 33, a deblocking filter 34, an SAO (Sample Adaptive Offset) filter 35, a frame memory 36, and a selector 37. Furthermore, the image encoding device 10 includes a correction method determination unit 40, an intra-prediction unit 41, an inter-prediction unit 42, and a prediction selector 43.

The fisheye image is input to the image sorting buffer 21 as an input image. Further, fisheye information regarding a fisheye lens used to obtain the fisheye image, and the fisheye image is input to the correction method determination unit 40. The fisheye information includes information indicating a projection method of the fisheye lens and a radius of the fisheye image, for example.

The image sorting buffer 21 stores the input image, and sorts stored frame images in display order so as to be in order for encoding (encoding order) according to a GOP (Group of Picture) structure. The image sorting buffer 21 outputs image data of the frame images (original image data) sorted to be in the encoding order, to the operator 22. The image sorting buffer 21 further outputs the original image data to the SAO filter 35, the intra-prediction unit 41, and the inter-prediction unit 42.

The operator 22 subtracts the predicted image data, which is supplied from the intra-prediction unit 41 or the inter-prediction unit 42 via the prediction selector 43, from the original image data supplied from the image sorting buffer 21 for each pixel, and outputs residue data indicating a predictive residue to the orthogonal transformation unit 23.

For example, in a case of an image on which intra-encoding is to be performed, the operator 22 subtracts predicted image data generated in the intra-prediction unit 41 from the original image data. In contrast, for example, in a case of an image on which inter-encoding is to be performed, the operator 22 subtracts predicted image data generated in the inter-prediction unit 42 from the original image data.

The orthogonal transformation unit 23 performs orthogonal transformation processing on the residue data supplied from the operator 22. For example, the orthogonal transformation unit 23 performs the orthogonal transformation processing such as discreate cosine transformation, discreate sine transformation, or Karhunen-Loéve transformation on each of one or more TUs set in each CTU (Coding Tree Unit). The orthogonal transformation unit 23 outputs transformation coefficients in a frequency domain, which are obtained by performing the orthogonal transformation, to the quantization unit 24.

The quantization unit 24 quantizes the transformation coefficients output from the orthogonal transformation unit 23. The quantization unit 24 outputs quantized data of the transformation coefficients to the lossless encoder 25. The quantization unit 24 also outputs the generated quantized data to the inverse quantization unit 31.

The lossless encoder 25 performs lossless encoding processing, for example, lossless encoding processing of CABAC (Context-Adaptive Binary Arithmetic Coding) on the quantized data of each CTU, which is input from the quantization unit 24. Further, the lossless encoder 25 obtains parameters of a prediction mode selected by the prediction selector 43, for example, information indicating the intra-prediction mode, or information indicating the inter-prediction mode and motion information. Furthermore, the lossless encoder 25 obtains parameters regarding filter processing from the SAO filter 35 to be described later. The lossless encoder 25 further obtains block information indicating how to set the CTU, CU, TU, and PU to the image. The lossless encoder 25 encodes the quantized data, and accumulates each obtained parameter regarding the encoding processing in the accumulating buffer 26 as a part of header information of the encoded stream. Each parameter serves as a syntax element of H.265/HEVC standards. In addition, the lossless encoder 25 includes the fisheye information input to the image encoding device 10 into the encoded stream as a syntax element of the encoded stream, or as SEI (Supplemental Enhancement Information) that is supplemental information.

The accumulating buffer 26 temporarily retains data supplied from the lossless encoder 25, and outputs the retained data to, for example, a recording device or a transmission line in a subsequent stage, which is not illustrated, as the encoded stream at predetermined timing. The retained data serves as an encoded image that has been encoded.

The rate controller 27 controls a rate of a quantizing operation of the quantization unit 24 so as not to cause overflow or underflow, on the basis of the compressed images accumulated in the accumulating buffer 26.

The inverse quantization unit 31 inversely quantizes the quantized data of the transformation coefficients supplied from the quantization unit 24 with a method corresponding to the quantization performed by the quantization unit 24. The inverse quantization unit 31 outputs the inversely quantized data thus obtained to the inverse orthogonal transformation unit 32.

The inverse orthogonal transformation unit 32 performs inverse orthogonal transformation on the inversely quantized data thus supplied with a method corresponding to the orthogonal transformation processing performed by the orthogonal transformation unit 23. The inverse orthogonal transformation unit 32 outputs the inverse orthogonal transformation result, that is, reconstructed residue data to the operator 33.

The operator 33 adds the predicted image data supplied from the intra-prediction unit 41 or the inter-prediction unit 42 via the prediction selector 43 to the residue data supplied from the inverse orthogonal transformation unit 32, and obtains a locally decoded image (decoded image). For example, in a case where the residue data corresponds to an image on which intra-encoding is performed, the operator 33 adds the predicted image data supplied from the intra-prediction unit 41 to the residue data. In contrast, for example, in a case where the residue data corresponds to an image on which inter-encoding is performed, the operator 33 adds the predicted image data supplied from the inter-prediction unit 42 to the residue data. The decoded image data that is the addition result is output to the deblocking filter 34. The decoded image data is also output to the frame memory 36 as reference image data.

The deblocking filter 34 performs deblocking filtering processing as appropriate to remove block distortion in the decoded image data. The deblocking filter 34 outputs the filtering processing result to the SAO filter 35.

The SAO filter 35 performs adaptive offset filtering processing (also referred to as SAO (Sample Adaptive Offset) processing) on the decoded image data after filtering by the deblocking filter 34. The SAO filter 35 outputs an image after the SAO processing to the frame memory 36.

The reference image data accumulated in the frame memory 36 is output to the intra-prediction unit 41 or the inter-prediction unit 42 via the selector 37 at predetermined timing. For example, in a case of the image on which the intra-encoding is performed, the reference image data on which the filtering processing by, for example, deblocking filter 34 is not performed is read from the frame memory 36, and is output to the intra-prediction unit 41 via the selector 37. In contrast, for example, in a case where the inter-encoding is performed, reference image data on which the filtering processing by, for example, the deblocking filter 34 is performed is read from the frame memory 36, and is output to the inter-prediction unit 42 via the selector 37.

On the basis of the fisheye information, the correction method determination unit 40 outputs a correction factor table corresponding to the fisheye lens used to obtain the fisheye image to the inter-prediction unit 4. The correction factor table is used in scaling processing of a motion vector used to calculate a predictive motion vector of a current predictive block. Note that details of the correction factor table will be described later. Further, the correction method determination unit 40 and the inter-prediction unit 42 configure a motion vector correction unit.

On the basis of the original image data and the decoded image data, the intra-prediction unit 41 performs intra-prediction processing on each of one or more PUs set in each CTU. The PU can be divided into one or more TUs. For example, with respect to each of prediction mode candidates included in a search range specified by the HEVC, the intra-prediction unit 41 evaluates a cost function value based on a prediction error and a code amount generated. Next, the intra-prediction unit 41 selects a prediction mode that minimizes the cost function value, that is, a prediction mode that maximizes a compression ratio, as an optimal prediction mode. Further, the intra-prediction unit 41 generates predicted image data according to the optimal prediction mode thus selected, and outputs information regarding the intra-prediction including prediction mode information indicating the optimal prediction mode, a corresponding cost function value, and the predicted image data, to the prediction selector 43.

On the basis of the original image and the decoded image data, the inter-prediction unit 42 performs inter-prediction processing (motion detection and motion compensation) on each of one or more PUs set in each CTU. For example, with respect to each of prediction mode candidates included in a search range specified by, for example, the HEVC, the inter-prediction unit 42 evaluates a cost function value based on a prediction error and a code amount generated. Further, by using the correction factor table generated in the correction method determination unit 40, the inter-prediction unit 42 performs scaling processing on a motion vector of a peripheral block adjacent to the current predictive block, for example, on the basis of a projection method of the fisheye lens and a radius of the fisheye image. Note that the scaling processing will be described later. The inter-prediction unit 42 generates the predictive motion vector using the motion vector after the scaling processing of the peripheral block, and generates a difference vector between the motion vector of the current predictive block and the predictive motion block, to use the difference vector to calculate the cost function value. Next, the inter-prediction unit 42 selects a prediction mode that minimizes the cost function value, that is, a prediction mode that maximizes a compression ratio, as an optimal prediction mode. Further, the inter-prediction unit 42 generates predicted image data according to the optimal prediction mode thus selected, and outputs information regarding the inter-prediction, a corresponding cost function value, motion information indicating, for example, the difference vector and the predictive motion vector, and the predicted image data, to the prediction selector 43.

The prediction selector 43 sets the prediction mode for each CTU or CU, on the basis of comparison between cost function values input from the intra-prediction unit 41 and the inter-prediction unit 42. With respect to blocks to which the intra-prediction mode is set, the prediction selector 43 outputs the predicted image data generated by the intra-prediction unit 41 to the operators 22 and 33, and outputs information regarding the intra-prediction to the lossless encoder 25. With respect to blocks to which the inter-prediction mode is set, the prediction selector 43 outputs the predicted image data generated by the inter-prediction unit 42 to the operators 22 and 33, and outputs information regarding the inter-prediction and the motion information to the lossless encoder 25.

3. Operation of Image Encoding Device

<3-1. Regarding Correction Factor Table>

Figure 2E:
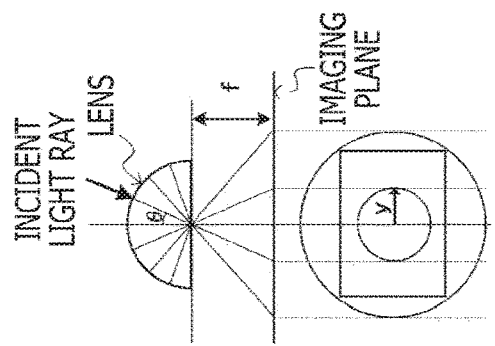
FIGS. 2A, 2B, 2C, 2D, and 2E depict views illustrating a projection method of a fisheye lens.
Figure 2D:
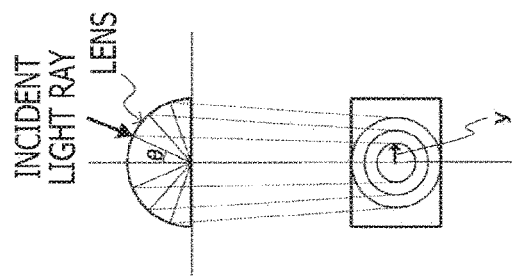
Figure 2C:
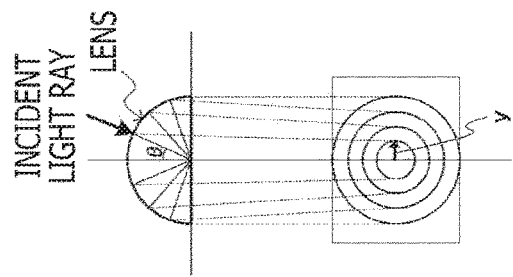
Figure 2B:
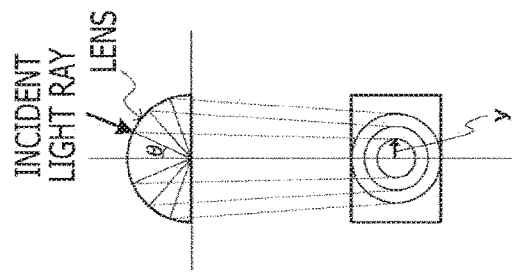
Figure 2A:
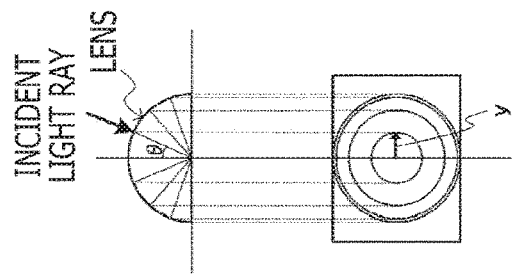

FIGS. 2A, 2B, 2C, 2D, and 2E illustrate a projection method of the fisheye lens. FIG. 2A is an orthogonal projection method, and a relationship (characteristic formula) between a light ray entered at an incident angle θ and a position y to which the entered light ray is projected can be expressed by the formula (1). Note that "f" is a focal length of the fisheye lens.

$$y = f \sin \theta \quad (1)$$

FIG. 2B is an equidistant projection method, and its characteristic formula is expressed by the formula (2).

$$y = f \theta \quad (2)$$

FIG. 2C is a stereographic projection method, and its characteristic formula is expressed by the formula (3).

$$y = 2f \tan(\theta/2) \quad (3)$$

FIG. 2D is an equisolid angle projection method, and its characteristic formula is expressed by the formula (4).

$$y = 2f \sin(\theta/2) \quad (4)$$

Note that a projection method of a lens that produces no fisheye distortion (hereafter, referred to as a "normal lens") is a central projection method indicated in FIG. 2E, and its characteristic formula is expressed by the formula (5).

$$y = f \tan \theta \quad (5)$$

A correction factor for correcting fisheye distortion produced due to a projection of a shooting subject image by a fisheye lens can be calculated, on the basis of characteristic formulas of the fisheye lens and the normal lens. For example, in a case where only a lens is modified while a focal length and a shooting condition are identical, the correction factor is calculated by "correction factor=characteristic formula of normal lens/characteristic formula of fisheye lens."

FIG. 3 illustrates a correction factor for correcting a fisheye image to be a normal image for each projection method. For example, the correction factor of the orthogonal projection method is "1/cos θ." Further, the correction factor of the equidistant projection method is "tan θ/θ," the correction factor of the stereographic projection method is "tan θ/(2*tan(θ/2))," and the correction factor of the equisolid angle projection method is "tan θ/(2*sin(θ/2))."

Meanwhile, each correction factor indicated in FIG. 3 uses the incident angle θ as a parameter, and therefore it is not easy to obtain a position on a normal image corresponding to a position on a fisheye image. To address this issue, the correction factor table that can obtain the position on the normal image corresponding to the position on the fisheye image is generated in advance, on the basis of the correction factor.

Figure 4B:
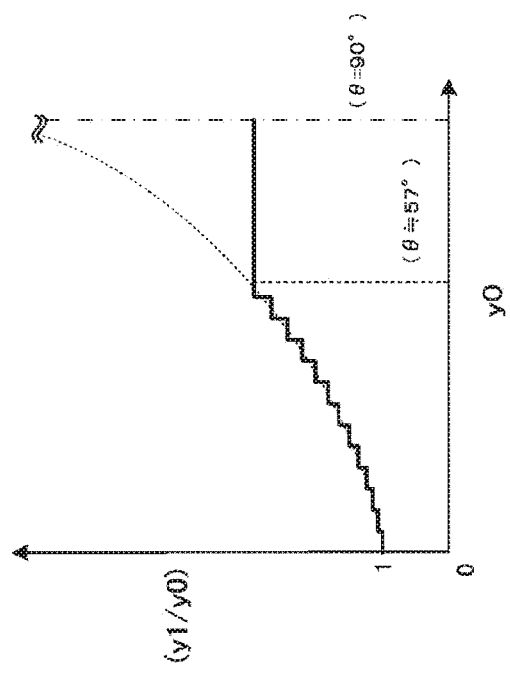
FIGS. 4A, 4B, 4C, and 4D depict views for explaining derivation of a correction factor table.
Figure 4D:
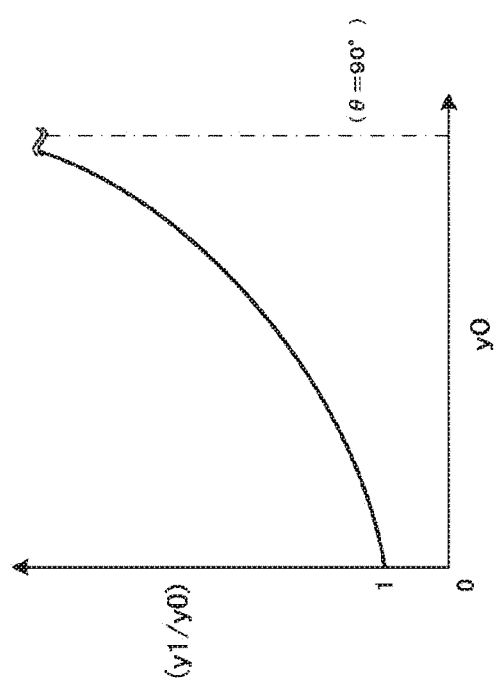
Figure 4A:
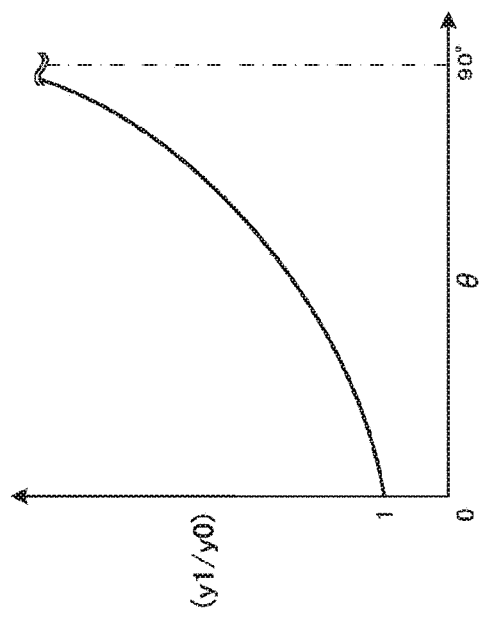
Figure 4C:
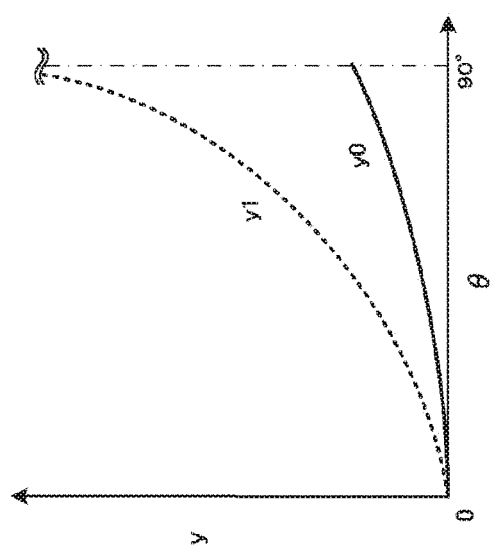

FIGS. 4A, 4B, 4C, and 4D depict views for explaining derivation of the correction factor table. As illustrated in FIG. 4A, the incident angle θ is varied within a range of 0°≤θ≤90°, and values of the characteristic formulas (hereinafter, referred to as "characteristic values") of the fisheye lens and the normal lens within the range are recorded. When the characteristic value before correction is denoted as y0, and the characteristic value after correction is denoted as y1, the correction factor (y1/y0) turns a characteristic indicated in FIG. 4B. Note that the correction factor in a case where the incident angle is 0° turns (0/0) so that it cannot be defined. However, at a center of the fisheye lens, distortion relative to a case where the normal lens is used is small, and therefore the correction factor thereof is defined as "1." On the basis of the results in FIGS. 4A and 4B, when the correction factor (y1/y0) is indicated with the characteristic value y0 as a reference, a relationship between the characteristic value y0 and the correction factor (y1/y0) turns a characteristic indicated in FIG. 4C. The correction factor table has the characteristic indicated in FIG. 4C. To reduce a data amount of the correction factor table, the correction factor indicated in FIG. 4C is sampled at a constant interval as indicated in FIG. 4D, and the correction factor table may indicate the correction factor relative to each sampled characteristic value y0.

In the central projection method used in the normal lens, its characteristic value increases as the incident angle θ approaches 90°, and when the incident angle θ reaches 90°, its characteristic value turns infinity. In an actual normal lens, an angle-of-field limit is near 57°, for example, and when an angle-of-field range is within the angle-of-field limit, the normal image can be handled as a natural image. However, when the angle-of-field range exceeds the angle-of-field limit, the normal image has increased divergence with the shooting subject in the shooting region. Accordingly, in the correction factor (y1/y0) indicated by the correction factor table, a range of the characteristic value y0 may be a range within a characteristic value yclp at the angle-of-field limit. When the correction factor table is generated in such a manner, a data amount of the correction factor table can be reduced without affecting the encoding processing.

The characteristic value varies depending on the focal length f, and therefore, in the correction factor table, the range of the characteristic value y0 is normalized within a range of "0" to "1." When the correction factor table in which the characteristic value y0 is normalized in such a manner is used, the correction factor (y1/y0) for the desired characteristic value y0 can be obtained, on the basis of the normalized correction factor table and the focal length. As a result, there is no need to provide the correction factor table for each focal length.

Figure 5:
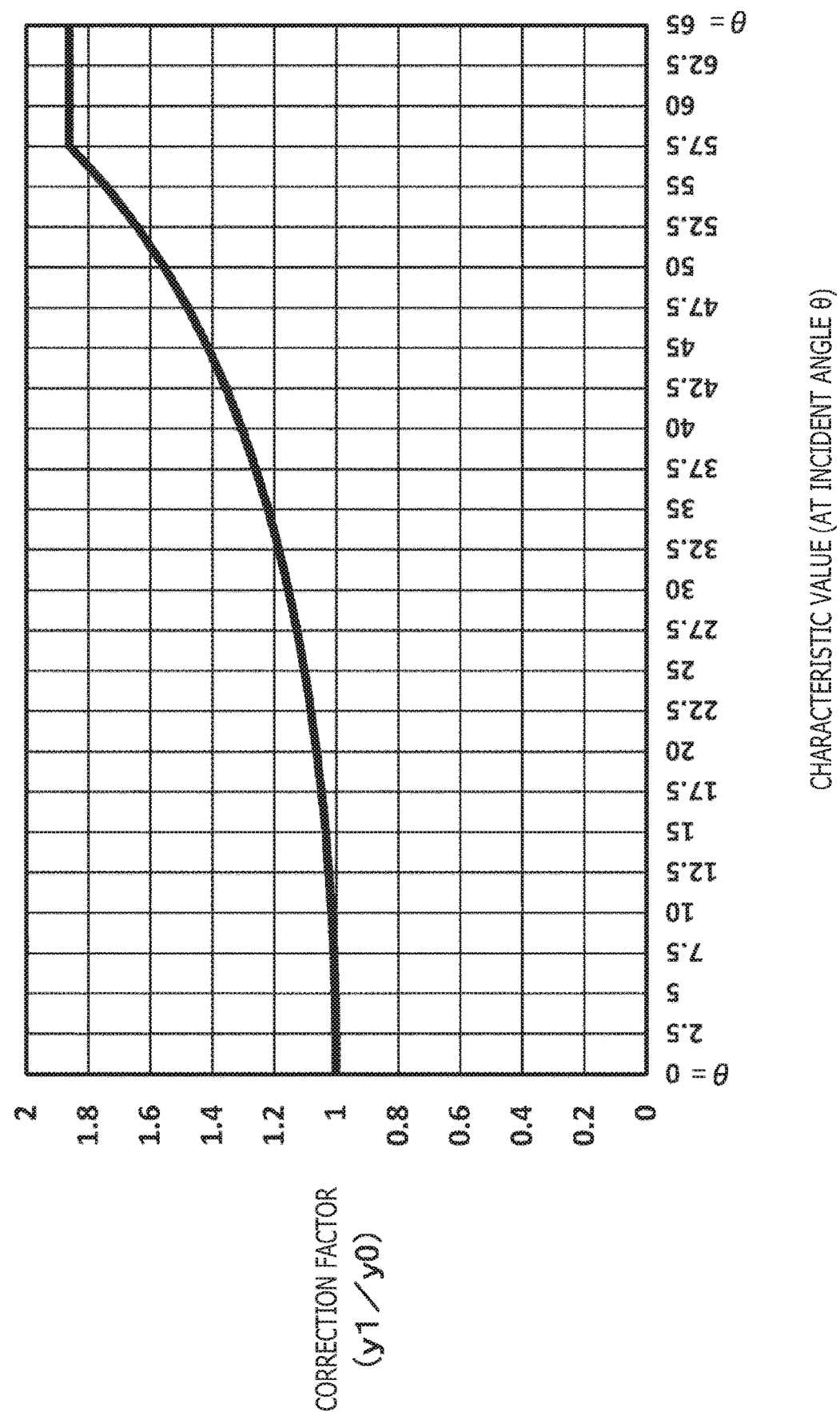
FIG. 5 is a view illustrating a normalized correction factor table.

FIG. 5 illustrates the normalized correction factor table, for example, the correction factor table normalized from the orthogonal projection method to the central projection method. Note that, in FIG. 5, due to reduced sampling intervals, a change in correction factor (y1/y0) relative to the characteristic value y0 is indicated in a continuous state.

Furthermore, when the normalized correction factor table is multiplied by a fisheye radius R, the correction factor table corresponding to the fisheye image having the fisheye radius R can be generated. Note that the normalized correction factor table is stored in advance in the correction method determination unit 40 and a correction method determination unit 74 in an image decoding device 50, which will be described later.

<3-2. Regarding Encoding Processing Operation>

Figure 6:
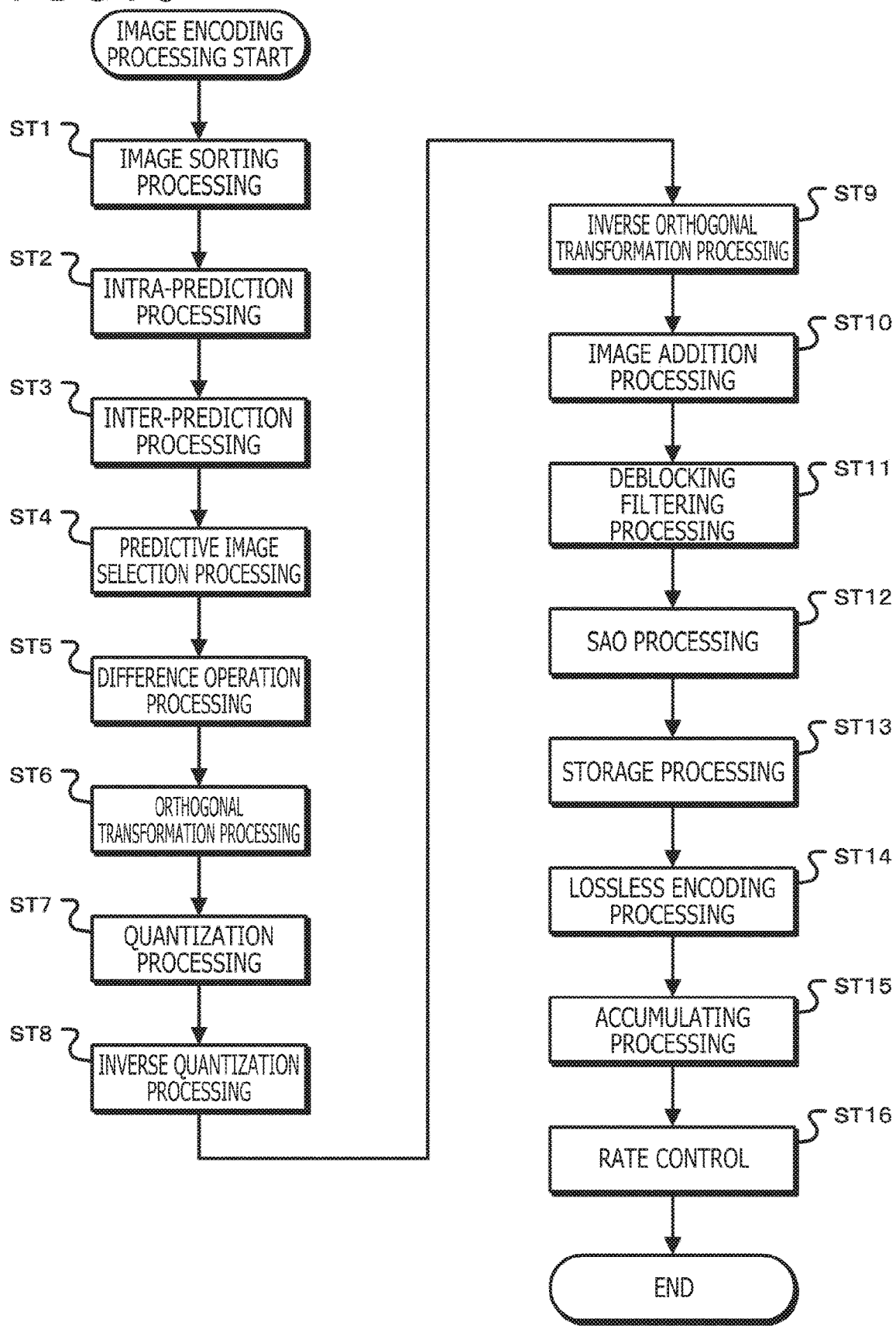
FIG. 6 is a flowchart illustrating an operation of the image encoding device.

Next, an operation of an image encoding device will be described. FIG. 6 is a flowchart illustrating the operation of the image encoding device.

In step ST1, the image encoding device performs image sorting processing. The image sorting buffer 21 in the image encoding device 10 sorts input images in display order to be in encoding order, and outputs the sorted images to the intra-prediction unit 41, the inter-prediction unit 42, and the SAO filter 35.

In step ST2, the image encoding device performs the intra-prediction processing. The intra-prediction unit 41 in the image encoding device 10 uses the reference image data read from the frame memory 36, and generates the predicted image data by performing the intra-prediction on pixels in blocks to be processed with all intra-prediction modes. Further, the intra-prediction unit 41 calculates the cost function value using the generated predicted image data and the original image data. Note that, as the reference image data, decoded image data on which the filtering processing by, for example, the deblocking filter 34 is not performed is used. The intra-prediction unit 41 selects the optimal intra-prediction mode, on the basis of the calculated cost function value, and outputs the predicted image data generated through the intra-prediction with the optimal intra-prediction mode, the parameters, and the cost function value, to the prediction selector 43.

Figure 7:
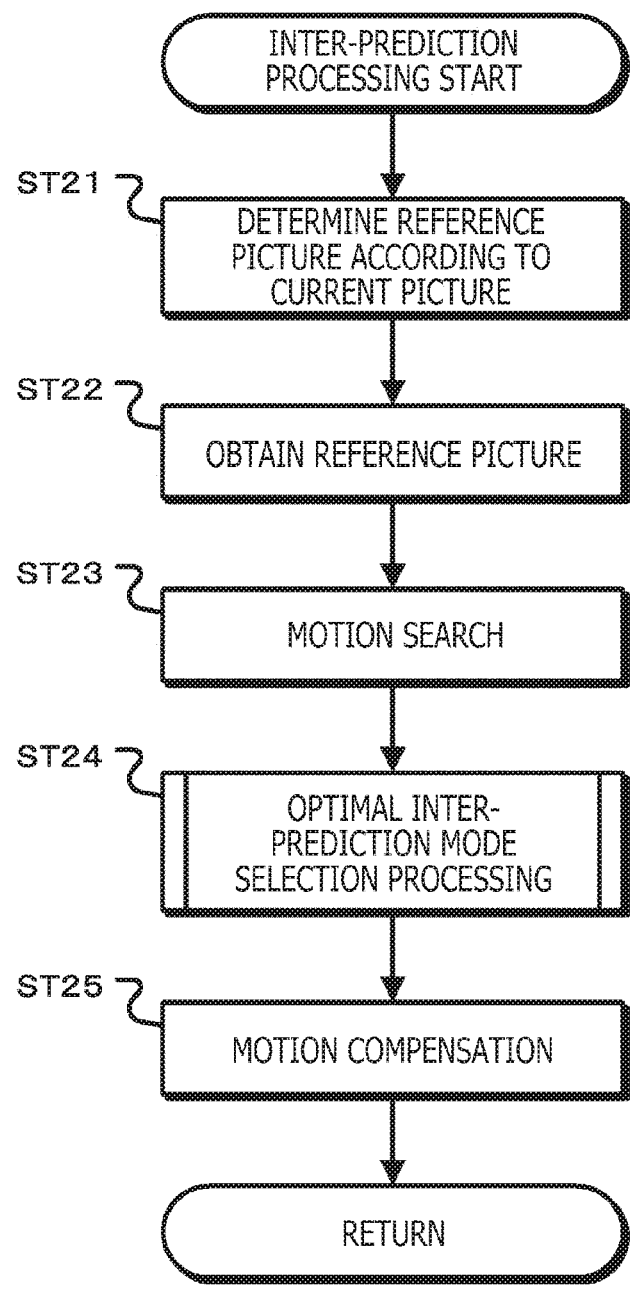
FIG. 7 is a flowchart illustrating an operation of inter-prediction processing.

In step ST3, the image encoding device performs the inter-prediction processing. FIG. 7 is a flowchart illustrating an operation of the inter-prediction processing. In step ST21, the inter-prediction unit 42 determines a reference picture according to a current picture. In a case where the current picture is a P picture (Predictive Picture), the inter-prediction unit 42 determines an I picture (Intra Picture) as the reference picture. In a case where the current picture is a B picture (Bidirectionally Predictive Picture), the inter-prediction unit 42 determines the P picture and the B picture as the reference pictures and proceeds to step ST22.

In step ST22, the inter-prediction unit 42 obtains the reference picture. The inter-prediction unit 42 obtains the reference picture stored in the frame memory 36, and proceeds to step ST23.

In step ST23, the inter-prediction unit 42 performs motion search. The inter-prediction unit 42 performs the motion search with respect to all prediction modes to determine which region in the reference picture is corresponded with the current predictive block of the current picture, and proceeds to step ST24.

Figure 8:
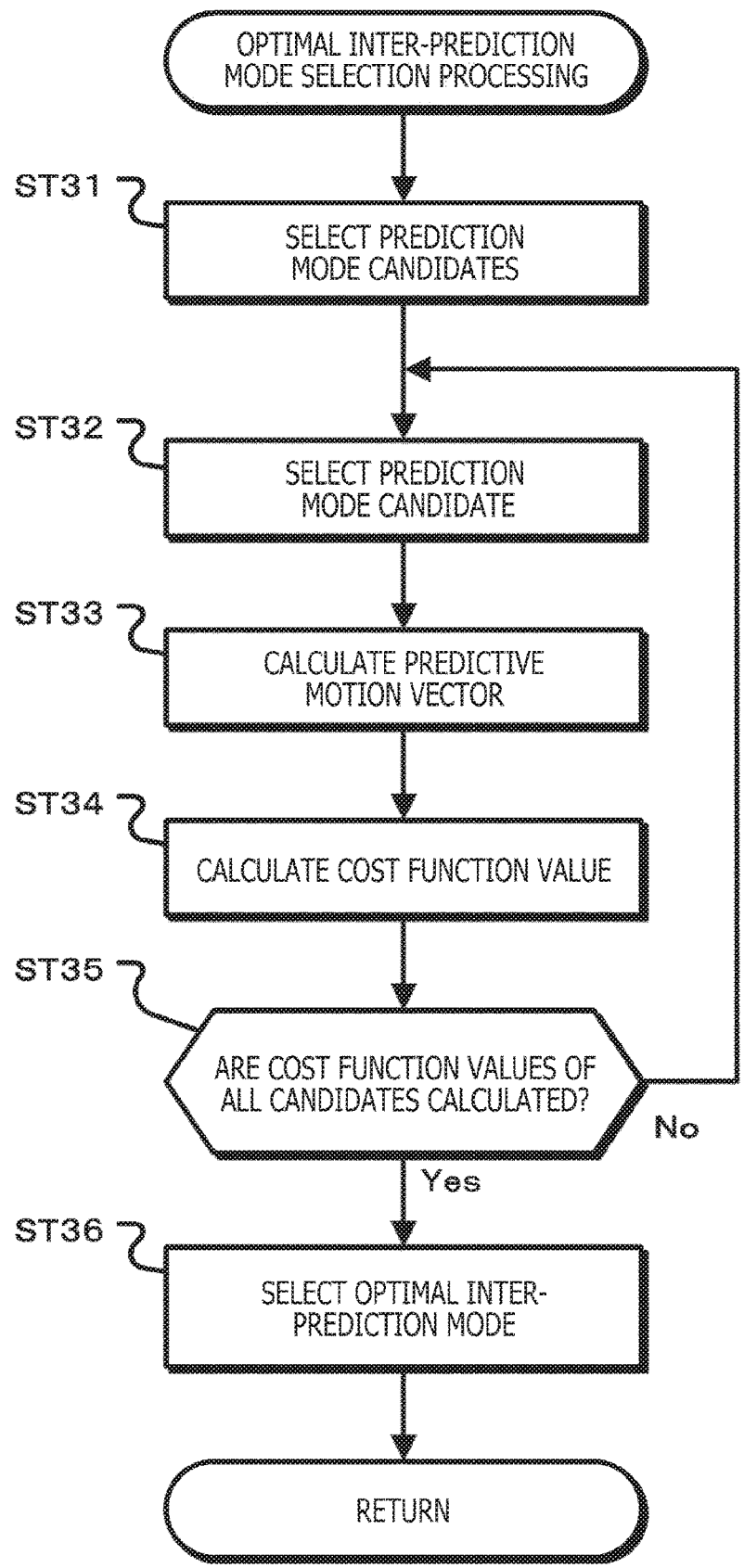
FIG. 8 is a flowchart illustrating optimal inter-prediction-mode selection processing.

In step ST24, the inter-prediction unit 42 performs optimal inter-prediction mode selection processing. FIG. 8 is a flowchart illustrating the optimal inter-prediction mode selection processing. In step ST31, the inter-prediction unit 42 selects prediction mode candidates. The inter-prediction unit 42 sets plural prediction mode candidates, for example, prediction modes whose motion vectors are calculated as the candidates, on the basis of the motion search result in step ST23, and proceeds to step ST32.

In step ST32, the inter-prediction unit 42 selects the prediction mode. The inter-prediction unit 42 selects an inter-prediction mode that is not yet selected from the inter-prediction mode candidates determined in step ST31, and proceeds to step ST33.

Figure 9:
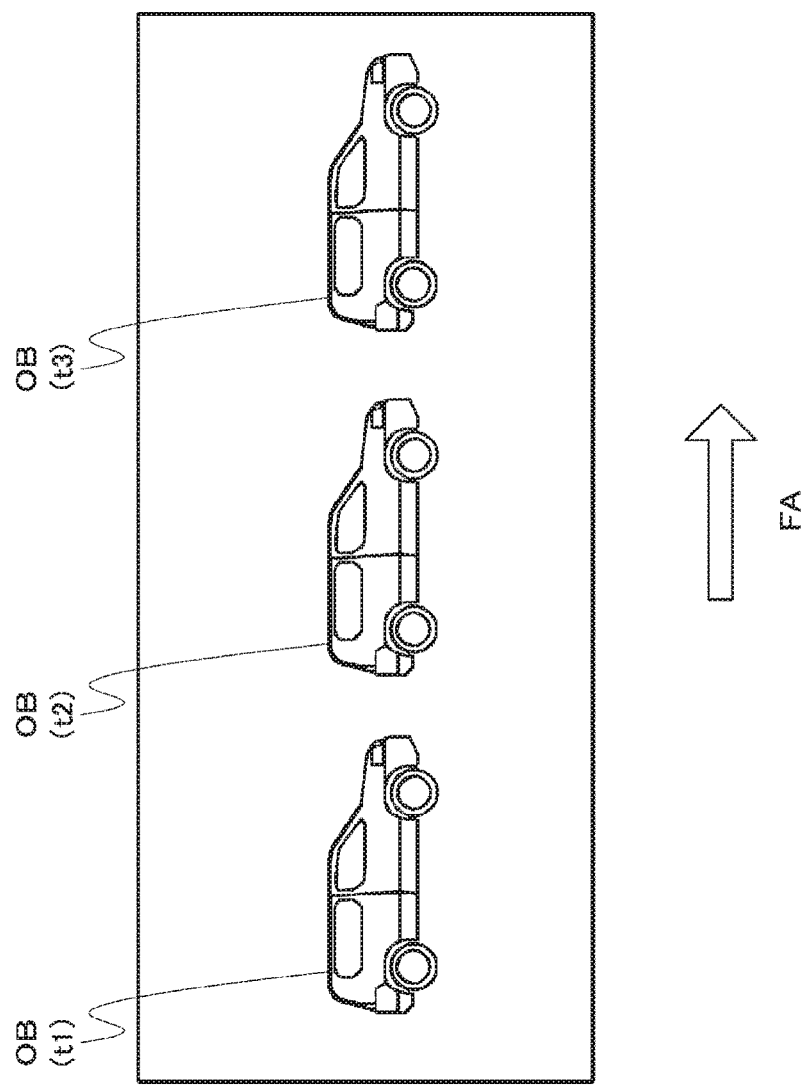
FIG. 9 is a view illustrating motion of a shooting subject in an image shot using a shooting lens of a central projection method.
Figure 10:
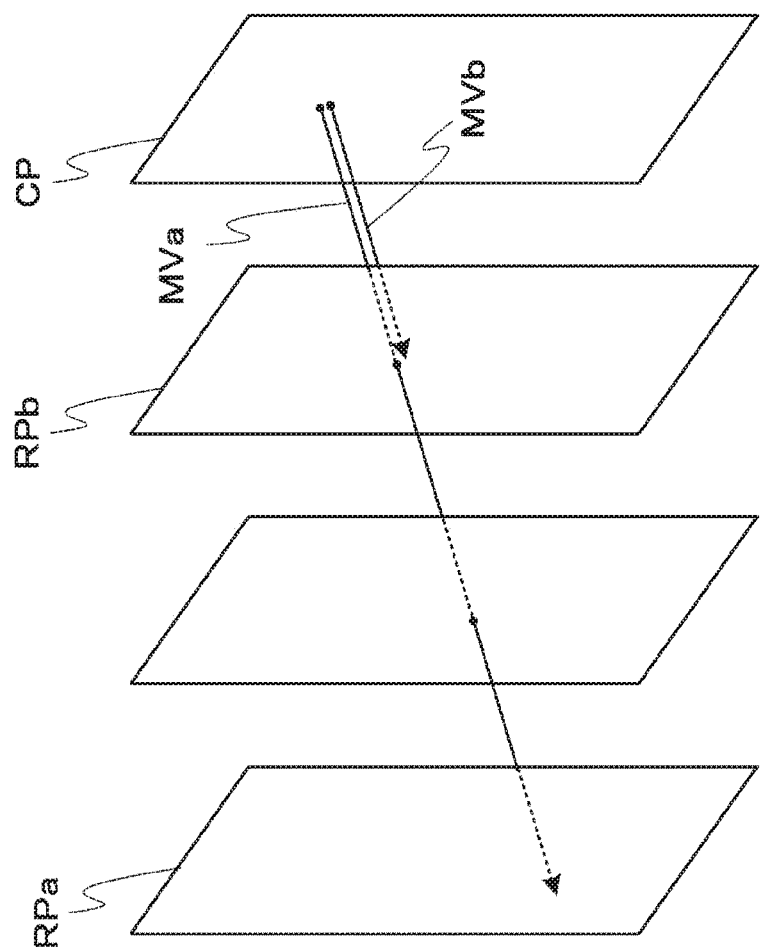
FIG. 10 is a view illustrating parallel scaling of the motion vector.
Figure 11:
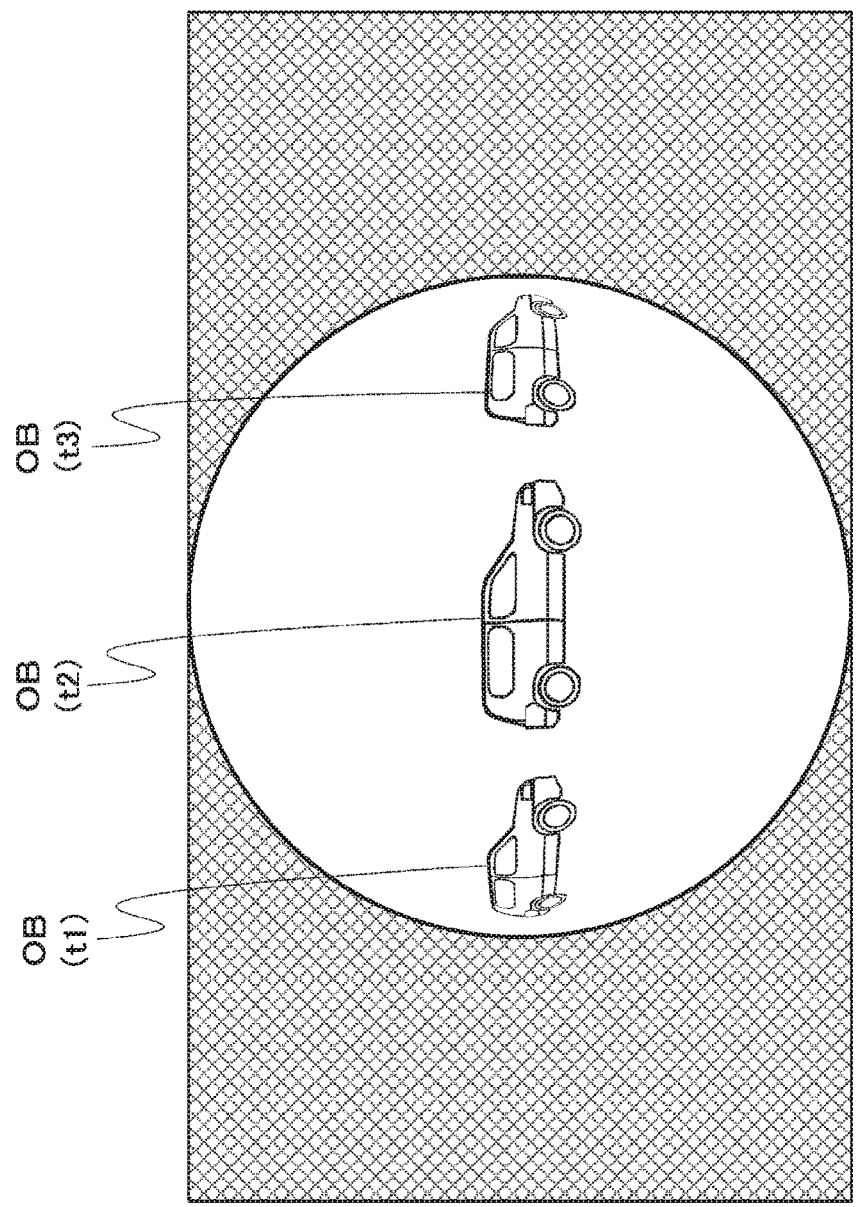
FIG. 11 is a view illustrating motion of the shooting subject in the fisheye image.

In step ST33, the inter-prediction unit 42 calculates the predictive motion vector. The inter-prediction unit 42 performs the scaling processing on the motion vector used to calculate the predictive motion vector. FIG. 9 illustrates motion of a shooting subject in an image shot using a shooting lens of the central projection method. FIG. 10 illustrates parallel scaling of a motion vector. A shooting subject OB moves along a direction of an arrow FA in FIG. 9. Note that FIG. 9 illustrates the shooting subject OB shot at a time point t1, a time point t2, and a time point t3. For example, in a case where the shooting subject OB moves along the arrow FA in the shooting image in such a manner, when a reference picture RPb is used as a reference destination instead of a reference picture RPa, a motion vector MVa when the reference picture RPa is used as a reference plane is only required to be subjected to the scaling to be a motion vector MVb, according to distances (time intervals) from a current picture CP to the reference pictures RPa and RPb. However, in the fisheye image, a strength and a direction of distortion of the shooting subject OB vary depending on a position on the fisheye image. FIG. 11 is a view illustrating motion of the shooting subject in the fisheye image, and illustrates the shooting subject OB shot at a time point t1, a time point t2, and a time point t3. In such a manner, the shooting subject produces fisheye distortion in the fisheye image. Therefore, when the predictive motion vector is calculated similar to the case where the shooting lens of the central projection method is used, an error between the predictive motion vector and the motion vector that is subjected to motion detection using a current predictive block and is calculated increases. This may decrease encoding efficiency. To address this issue, the inter-prediction unit 42 performs scaling along a trajectory of an object in a fisheye image (hereafter, also referred to as "adaptive scaling") on a motion vector used to calculate a predictive motion vector. The adaptive scaling is performed using the correction factor table corresponding to a shooting lens used to obtain the fisheye image. The inter-prediction unit 42 calculates the predictive motion vector using the motion vector after the scaling, and proceeds to step ST34.

In step ST34, the inter-prediction unit 42 calculates a cost function value. The inter-prediction unit 42 calculates the cost function values of the inter-prediction modes selected in step ST32, and proceeds to step ST35.

In step ST35, the inter-prediction unit 42 determines whether all candidates are selected. In a case where all inter-prediction modes are selected, the inter-prediction unit 42 proceeds to step ST36. In a case where there are unselected inter-prediction modes, the inter-prediction unit 42 returns to step ST32, and selects a new unselected inter-prediction mode.

In step ST36, the inter-prediction unit 42 selects an optimal inter-prediction mode. The inter-prediction unit 42 compares cost function values calculated for respective prediction modes, and, for example, selects a prediction mode whose cost function value is minimized as the optimal inter-prediction mode. The inter-prediction unit 42 then proceeds to step ST25 in FIG. 7. Note that, as long as the optimal inter-prediction mode can be selected by performing the scaling processing on the motion vector, on the basis of the fisheye information in the calculation of the predictive motion vector, processing different from FIG. 8 may be performed.

In step ST25, the inter-prediction unit 42 performs motion compensation. The inter-prediction unit 42 performs the motion compensation in the optimal inter-prediction mode selected in step ST36 in FIG. 8 to generate the predicted image data. Further, the inter-prediction unit 42 outputs the generated predicted image data, the cost function value of the optimal inter-prediction mode, the motion information, and the parameters of the optimal inter-prediction mode, to the prediction selector 43, and proceeds to step ST4 in FIG. 6.

In step ST4, the image encoding device performs predicted image selection processing. The prediction selector 43 in the image encoding device 10 determines one of the optimal intra-prediction mode and the optimal inter-prediction mode as an optimal prediction mode, on the basis of the cost function values calculated in step ST2 and step ST3. The prediction selector 43 then selects the predicted image data of the determined optimal prediction mode, and outputs the predicted image data to the operators 22 and 33. Note that the predicted image data is used in operations in steps ST5 and ST10, which will be described later. Further, the prediction selector 43 outputs the parameters regarding the optimal prediction mode, for example, to the lossless encoder 25.

In step ST5, the image encoding device performs difference operation processing. The operator 22 in the image encoding device 10 calculates a difference between the original image data sorted in step ST2 and the predicted image data selected in step ST4, and outputs the residue data that is the difference result to the orthogonal transformation unit 23.

In step ST6, the image encoding device performs orthogonal transformation processing. The orthogonal transformation unit 23 in the image encoding device 10 performs orthogonal transformation on the residue data supplied from the operator 22. Specifically, the orthogonal transformation unit 23 performs the orthogonal transformation such as discreate cosine transformation, and outputs obtained transformation coefficients to the quantization unit 24.

In step ST7, the image encoding device performs quantization processing. The quantization unit 24 in the image encoding device 10 quantizes the transformation coefficients supplied from the orthogonal transformation unit 23. Upon quantizing, the rate is controlled as described in processing in step ST16 described later.

Quantization information generated as described above is locally decoded in the following manner. In other words, the image encoding device performs the inverse quantization processing in step ST8. The inverse quantization unit 31 in the image encoding device 10 inversely quantizes the quantized data output from the quantization unit 24 with a characteristic corresponding to the quantization unit 24.

In step ST9, the image encoding device performs inverse orthogonal transformation processing. The inverse orthogonal transformation unit 32 in the image encoding device 10 performs inverse orthogonal transformation on the inversely quantized data generated in the inverse quantization unit 31 with a characteristic corresponding to the orthogonal transformation unit 23 to generate the residue data, and outputs the residue data to the operator 33.

In step ST10, the image encoding device performs image addition processing. The operator 33 in the image encoding device 10 adds the predicted image data output from the prediction selector 43 to the locally-decoded residue data, and generates a locally-decoded (i.e., subjected to local decoding) image.

In step ST11, the image encoding device performs deblocking filtering processing. The deblocking filter 34 in the image encoding device 10 performs the deblocking filtering processing on the image data output from the operator 33 to remove the block distortion, and outputs the resultant image data to the SAO filter 35 and the frame memory 36.

In step ST12, the image encoding device performs SAO processing. The SAO filter 35 in the image encoding device 10 performs the SAO processing on the image data output from the deblocking filter 34. By this SAO processing, a type and a coefficient of the SAO processing for each LCU that is a maximum encoding unit are obtained, and the filtering processing is performed using those. The SAO filter 35 stores the image data after the SAO processing in the frame memory 36. Further, the SAO filter 35 outputs the parameters regarding the SAO processing to the lossless encoder 25, to perform the encoding in step ST14 as described later.

In step ST13, the image encoding device performs storage processing. The frame memory 36 in the image encoding device 10 stores the image before the filtering processing is performed with, for example, the deblocking filter 34, and the image after the filtering processing is performed with, for example, the deblocking filter 34.

On the other hand, the transformation coefficients quantized in above-described step ST7 are also output to the lossless encoder 25. In step ST14, the image encoding device performs lossless encoding processing. The lossless encoder 25 in the image encoding device 10 encodes the transformation coefficients after quantization output from the quantization unit 24, and each parameter and the fisheye information that are supplied.

In step ST15, the image encoding device performs accumulating processing. The accumulating buffer 26 in the image encoding device 10 accumulates the encoded data. The encoded data accumulated in the accumulating buffer 26 is read as appropriate, and is transmitted to the decoding side via a transmission line, for example.

In step ST16, the image encoding device performs rate control. The rate controller 27 in the image encoding device 10 controls a rate of the quantizing operation in the quantization unit 24 so as not to cause overflow or underflow of the encoded data accumulated in the accumulating buffer 26.

<3-3. Regarding Adaptive Scaling of Motion Vector>

Next, the adaptive scaling of the motion vector to be performed in the inter-prediction will be described. Note that coordinates used in the following description are represented in a pixel unit.

Figure 12B:
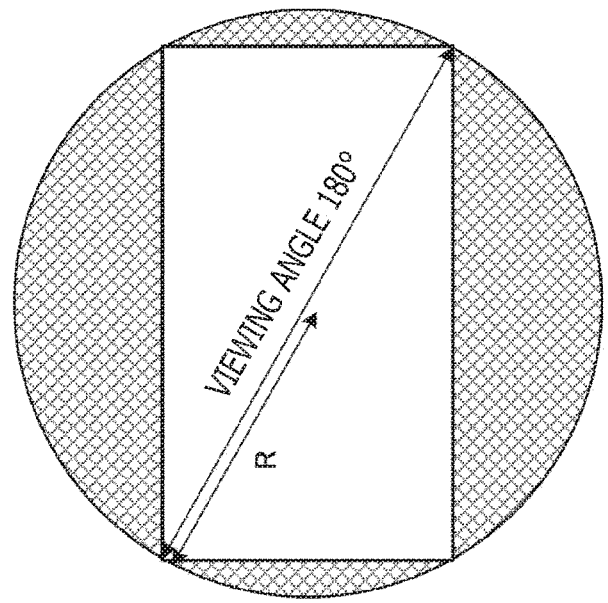
FIGS. 12A and 12B depicts views for explaining a circumferential fisheye and a diagonal-line fisheye.
Figure 12A:
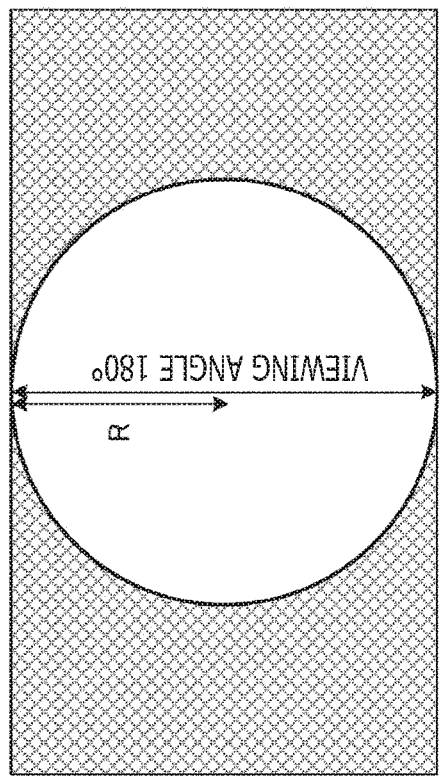

The inter-prediction unit 42 obtains center coordinates (xg, yg) of the fisheye image. Fisheye lenses are classified into a circumferential fisheye and a diagonal-line fisheye due to not only the above-described projection methods but also a difference in method for projecting an optical image on a sensor plane of an image sensor. FIGS. 12A and 12B depict views for explaining the circumferential fisheye and the diagonal-line fisheye. FIG. 12A illustrates a case where a circumferential fisheye lens is used. The fisheye image shot by the fisheye lens is entirely included in the sensor plane of the image sensor. In a rectangular picture, useless regions having no data (regions indicated by oblique lines) are produced on both left-right ends of the fisheye image, for example. FIG. 12B illustrates a case where a diagonal-line fisheye lens is used. The sensor plane of the image sensor is included in a circular fisheye image. Regions indicated by oblique lines in the fisheye image are regions that are not displayed in a picture. Center coordinates of the circumferential fisheye and center coordinates of the diagonal-line fisheye coincide with each other, and therefore the adaptive scaling of the diagonal-line fisheye may be performed similar to a case of the circumferential fisheye.

Figure 13:
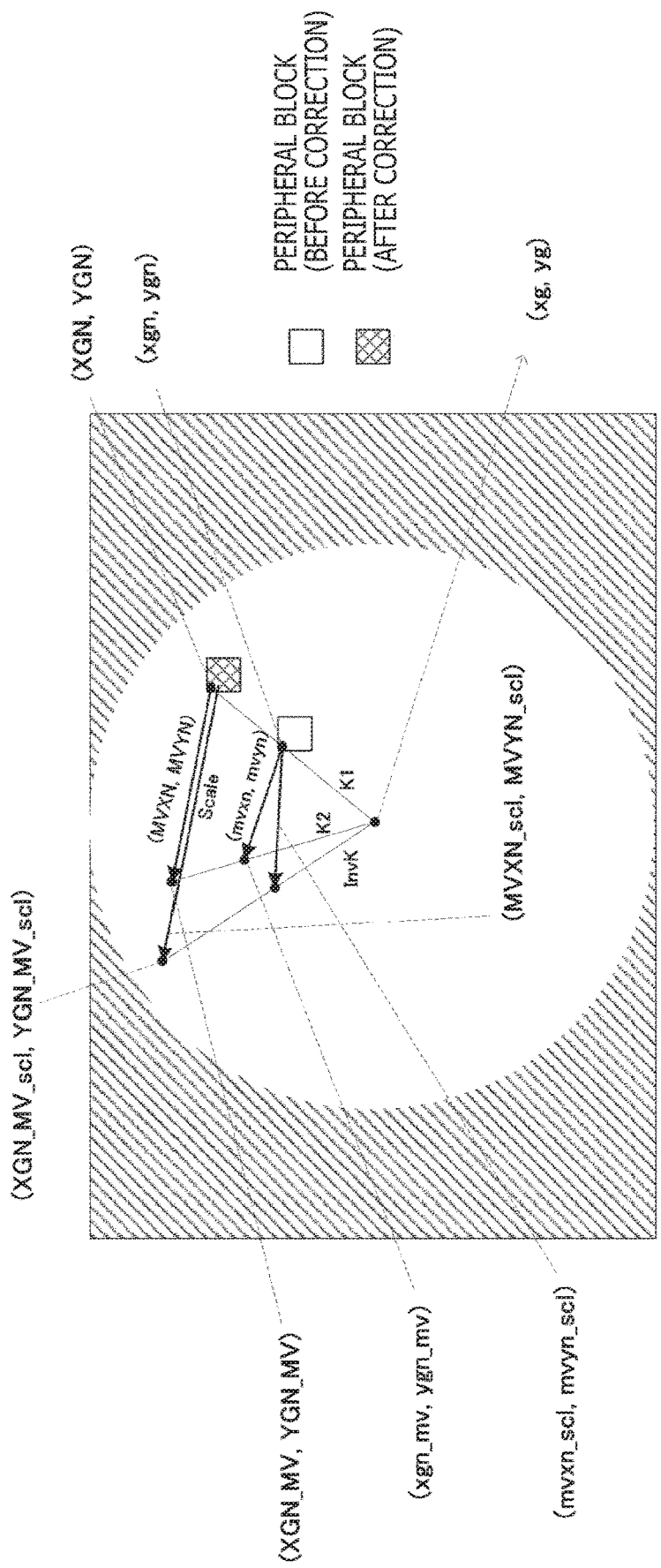
FIG. 13 is a view for explaining an adaptive scaling procedure.

FIG. 13 is a view for explaining an adaptive scaling procedure. The inter-prediction unit 42 defines the center coordinates (xg, yg) of the fisheye image based on the formulas (6) and (7).

$$xg = \text{horizontal image size}/2 \quad (6)$$

$$yg = \text{vertical image size}/2 \quad (7)$$

Figure 14:
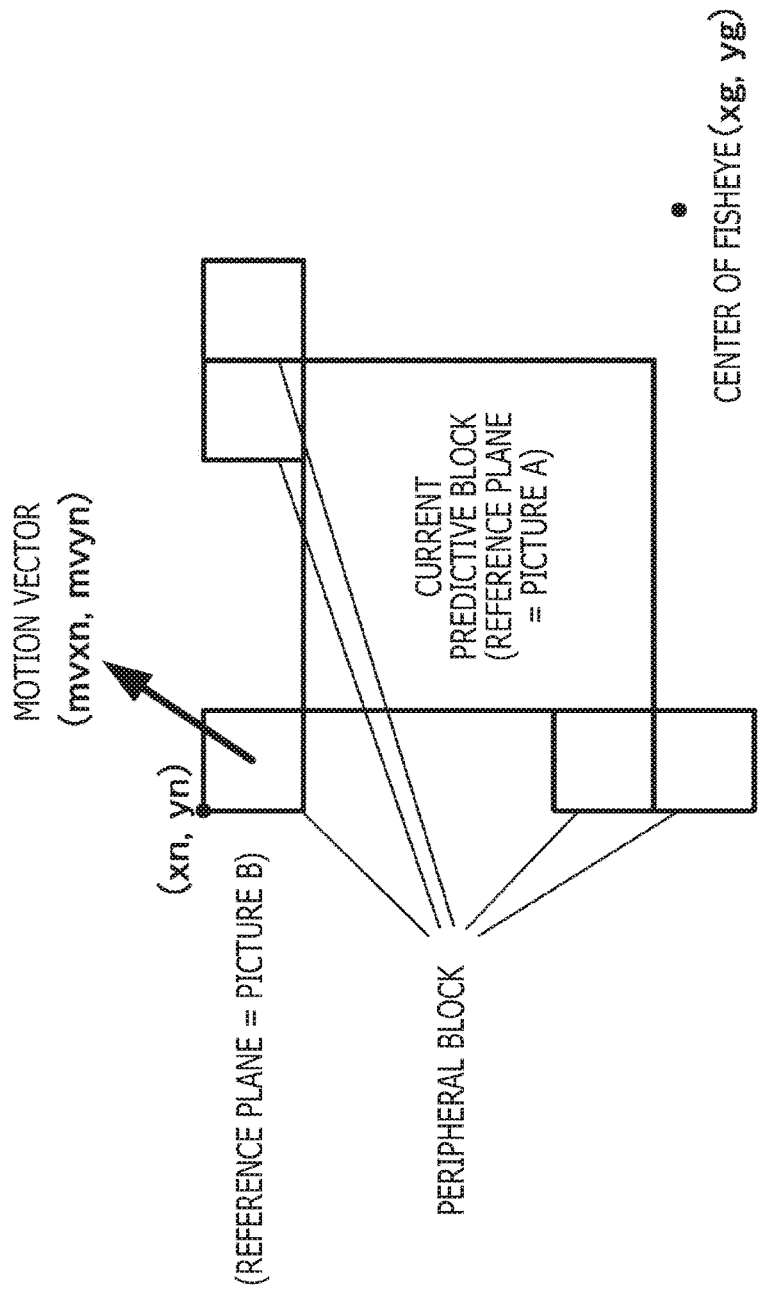
FIG. 14 is a view illustrating a current predictive block and peripheral blocks.

Next, coordinates of the peripheral blocks relative to the current predictive block are expressed by vectors from the center of the fisheye. FIG. 14 illustrates the current predictive block and the peripheral blocks. Left upper coordinates (xn, yn) of the peripheral block on a left upper side are assigned as a reference (0, 0) that is a left upper corner of a picture, and by subtracting the center coordinates (xg, yg) of the fisheye obtained from the formulas (6) and (7) from those coordinates, the center of the fisheye is defined as the reference. In this case, the position of the peripheral block neighboring the left upper side has coordinates (xng, yng) as expressed in the formula (8).

$$(xgn, ygn) = (xn - xg, yn - yg) \quad (8)$$

Furthermore, by adding a motion vector (mvxn, mvyn) of the peripheral block to the coordinates of the peripheral block, coordinates (xgn_mv, ygn_mv) indicated by the motion vector also define the center of the fisheye as the reference as expressed in the formula (9).

$$(xgn\_mv, ygn\_mv) = (xn - xg + mvxn, yn - yg + mvyn) \quad (9)$$

Furthermore, the coordinates in the fisheye image expressed by the formulas (8) and (9) are transformed into coordinates in the normal image using the correction factor table. Here, the correction factor table used for the coordinate transformation is generated by multiplying the normalized correction factor table by the fisheye radius R.

Here, when the correction factor corresponding to the coordinates (xng, yng) is defined as a correction factor "K1," and the correction factor corresponding to the coordinates (xgn_mv, ygn_mv) is defined as a correction factor "K2," corrected coordinates (XGN, YGN) of the coordinates (xgn, yng) can be calculated, on the basis of the formula (10), and corrected coordinates (XGN_MV, YGN_MV) of the coordinates (xgn_mv, ygn_mv) can be calculated, on the basis of the formula (11).

$$(XGN, YGN) = (K1 \cdot xgn, K1 \cdot ygn) \quad (10)$$

$$(XGN\_MV, YGN\_MV) = (K2 \cdot xgn\_mv, K2 \cdot ygn\_mv) \quad (11)$$

Accordingly, as illustrated in the formula (12), by subtracting the coordinates expressed by the formula (10) from the coordinates expressed by the formula (11), a corrected motion vector (MVXN, MVYN) of the peripheral block can be calculated.

$$(MVXN, MVYN) = (XGN\_MV - XGN, YGN\_MV - YGN) \quad (12)$$

The corrected motion vector (MVXN, MVYN) is a motion vector transformed to the normal image, and therefore scaling of the corrected motion vector is performed similar to a motion vector of the normal image. When a reference plane of the peripheral blocks is a picture "B" while a reference plane of the current predictive block illustrated in FIG. 14 is the picture A, scales of the motion vectors are different from each other. Therefore, the scaling processing is performed on the motion vectors of the peripheral blocks similar to those of the normal image. The scaling of the normal image conforms to the standards of existing codecs or next-generation codecs.

When the scaling processing is denoted as Scale( ), a scaled motion vector (MVXN_scl, MVYN_scl) can be calculated, on the basis of the formula (13).

$$(MVXN\_scl, MVYN\_scl) = (Scale(MVXN), Scale(MVYN)) \quad (13)$$

Furthermore, coordinates (XGN_MV_scl, YGN_MV_scl) indicated by the scaled motion vector (MVXN_scl, MVYN_scl) can be calculated by adding the coordinates expressed in the formula (10), as expressed by the formula (14).

$$(XGN\_MV\_scl, YGN\_MV\_scl) = (Scale(MVXN) + XGN, Scale(MVYN) + YGN) \quad (14)$$

Furthermore, when reverse look-up of the correction factor table is applied to the coordinates (XGN_MV_scl, YGN_MV_scl) calculated by the formula (14), the coordinates in the normal image are returned to the coordinates in the fisheye image. A result obtained by subtracting the coordinates (XGN, YGN) calculated by the formula (10) from the coordinates of the fisheye image turns a motion vector after adaptive scaling. Note that when the reverse look-up of the correction factor table is applied, in a case where coordinates before reverse look-up are located outside the angle-of-field limit, processing for bringing back the coordinates to angle-of-field limit values is performed.

Accordingly, the motion vector (mvxn_scl, mvyn_scl) after adaptive scaling can be calculated, on the basis of the formula (15).

$$(mvxn\_scl, mvyn\_scl) = (InvK(XGN\_MV\_scl) - xgn, InvK(YGN\_MV\_scl) - ygn) \quad (15)$$

Thereafter, calculation of the current predictive block and calculation of the difference motion vector are performed as described above, according to the standards of the existing codecs or the next-generation codecs.

Figure 15:
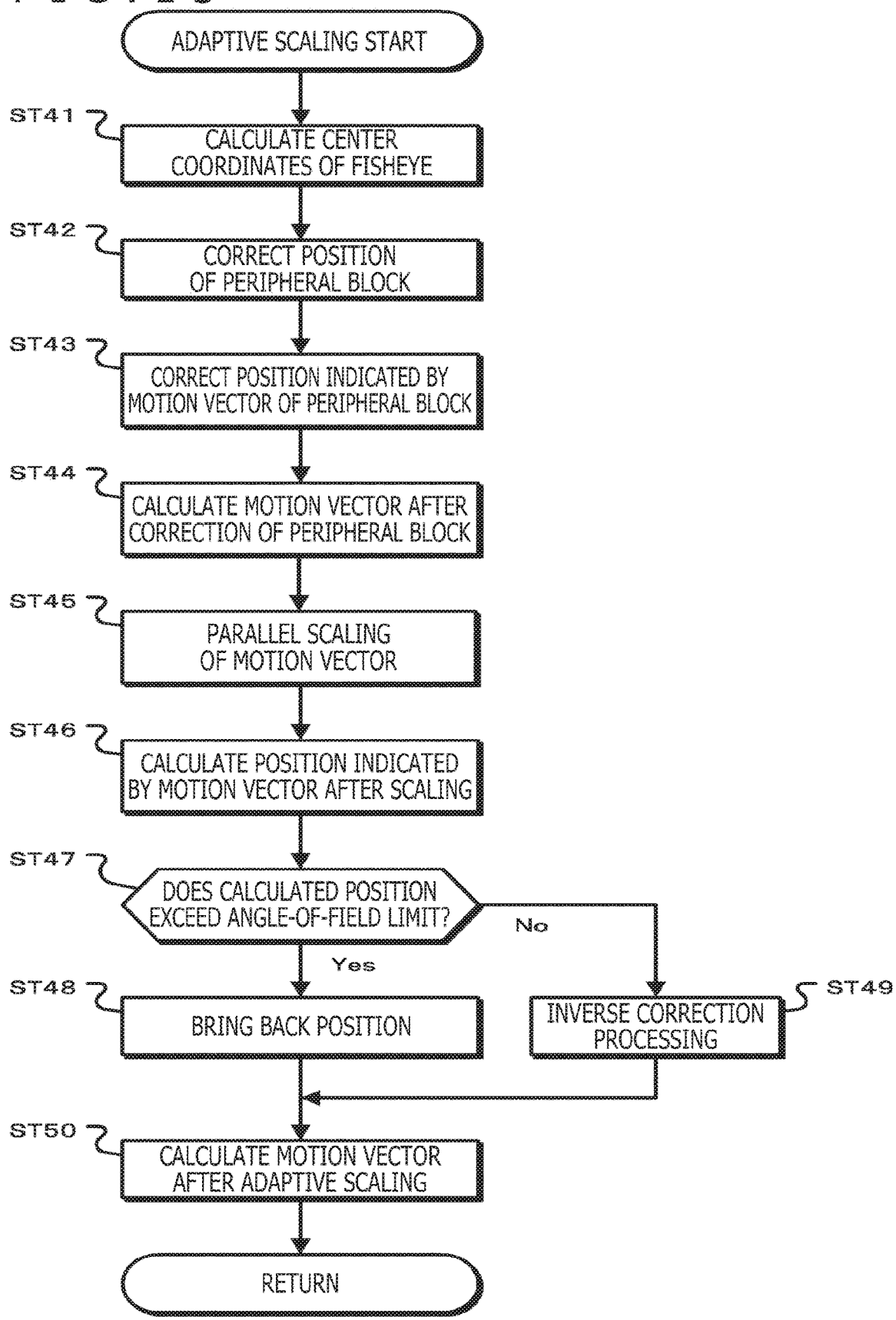
FIG. 15 is a flowchart illustrating the adaptive scaling procedure.

FIG. 15 is a flowchart illustrating the adaptive scaling procedure. In step ST41, the inter-prediction unit 42 defines the center coordinates of the fisheye as the reference. The inter-prediction unit 42 performs the operations in the formulas (6) and (7) described above to calculate the center coordinates of the fisheye. Further, the inter-prediction unit 42 performs the operations in the formulas (8) and (9) described above to define the position of the peripheral block or the reference of the motion vector as the center coordinates of the fisheye, and proceeds to step ST42.

In step ST42, the inter-prediction unit 42 corrects the position of the peripheral block. The inter-prediction unit 42 obtains the correction factor corresponding to the position of the peripheral block with the center coordinates of the fisheye as the reference, performs the operation in the formula (10) described above, corrects the coordinates in the fisheye image to the coordinates in the normal image, and then proceeds to step ST43.

In step ST43, the inter-prediction unit 42 corrects the position indicated by the motion vector of the peripheral block. The inter-prediction unit 42 obtains, from the correction factor table, the correction factor corresponding to the position indicated by the motion vector of the peripheral block with the center coordinates of the fisheye as the reference, performs the operation in the formula (11) described above, corrects the coordinates in the fisheye image to the coordinates in the normal image, and then proceeds to step ST44.

In step ST44, the inter-prediction unit 42 calculates the corrected motion vector of the peripheral block. The inter-prediction unit 42 performs the operation in the formula (12) described above using the position indicated by the motion vector corrected in step ST43 and the position of the peripheral block corrected in step ST42, calculates the corrected motion vector of the peripheral block, that is, the motion vector transformed into the normal image, and then proceeds to step ST45.

In step ST45, the inter-prediction unit 42 performs parallel scaling of the motion vector. Since the corrected motion vector calculated in step ST44 is the motion vector transformed into the normal image, the inter-prediction unit 42 performs the operation in the formula (13) described above, performs the scaling of the motion vector similar to a case of the normal image, and then proceeds to step ST46.

In step ST46, the inter-prediction unit 42 calculates a position indicated by the motion vector after scaling. The inter-prediction unit 42 performs the operation in the formula (14) described above using the position of the peripheral block in the normal image, which is calculated in step ST42, and the motion vector after scaling, which is calculated in step ST45, calculates the position indicated by the motion vector after scaling, and then proceeds to step ST47.

In step ST47, the inter-prediction unit 42 determines whether the calculated position exceeds the angle-of-field limit. The inter-prediction unit 42 proceeds to step ST48 in a case where the position indicated by the motion vector after scaling, which is calculated in step ST46, exceeds the angle-of-field limit of the fisheye image, or proceeds to step ST49 in a case where the position indicated by the motion vector after scaling, which is calculated in step ST46, does not exceed the angle-of-field limit of the fisheye image.

In step ST48, the inter-prediction unit 42 brings back the position. Since the position indicated by the motion vector after scaling, which is calculated in step ST46, exceeds the angle-of-field limit, the inter-prediction unit 42 brings back the position to the angle-of-field limit while retaining its vector direction, and proceeds to step ST50.

When proceeding from step ST47 to step ST49, the inter-prediction unit 42 performs inverse correction processing. Since the position indicated by the motion vector after scaling, which is calculated in step ST48, is the position in the normal image, the inter-prediction unit 42 obtains an inverse correction factor for correcting the position in the normal image to the position in the fisheye image from the correction factor table, on the basis of the position in the normal image, multiplies the position in the normal image, which is indicated by the motion vector after scaling, by the obtained inverse correction factor to correct to the position in the fisheye image, and then proceeds to step ST50.

In step ST50, the inter-prediction unit 42 calculates a motion vector after adaptive scaling. The inter-prediction unit 42 performs the operation in the formula (15) described above using the position of the peripheral block with the center coordinates of the fisheye as the reference and the position in the fisheye image, which is indicated by the motion vector after scaling to calculate the motion vector after adaptive scaling in the fisheye image.

Note that the case where the above-described image encoding device generates the encoded stream conforming to the H.265/HEVC standards has been described. However, a case where the image encoding device generates an encoded stream conforming to other motion picture compression encoding standards such as H.264/AVC standards may be employed. Alternatively, the image encoding device may perform the scaling processing on another motion vector in addition to the motion vector of the peripheral block. For example, when scaling of a motion vector in a direct mode of the H.264/AVC standards is performed, the scaling of the motion vector may be performed, on the basis of the fisheye information.

According to such an image encoding device, by performing the scaling processing on the motion vector, on the basis of the fisheye information, a predictive motion vector close to an actual image pattern can be generated even when an image to be encoded is the fisheye image, and therefore the encoding can efficiently be performed in comparison with a case where the scaling processing is not performed. Furthermore, the image encoding device performs the correction using the correction factor calculated, on the basis of the characteristic formula of the projection method of the fisheye lens used for shooting and the characteristic formula of the central projection method for obtaining the image having no fisheye distortion. This enables theoretically correct correction, whereby accuracy of processing premised on the correction can be increased. Further, the image encoding device uses the correction factor table, thereby facilitating calculation of the correction factor in comparison with a case where a correction factor is calculated, on the basis of, for example, a projection method or a position in the fisheye image.

Furthermore, the image encoding device performs the scaling processing on the motion vector used to calculate the predictive motion vector. Therefore, in a case where the difference motion vector is used as the motion information of the current predictive block, accuracy of the motion vector of the current predictive block is not affected. Further, it is unnecessary for the image encoding device to perform processing for transforming the fisheye image to the normal image, whereby missing of images does not occur in the fisheye images obtained through the decoding processing.

4. Configuration of Image Decoding Device

Figure 16:
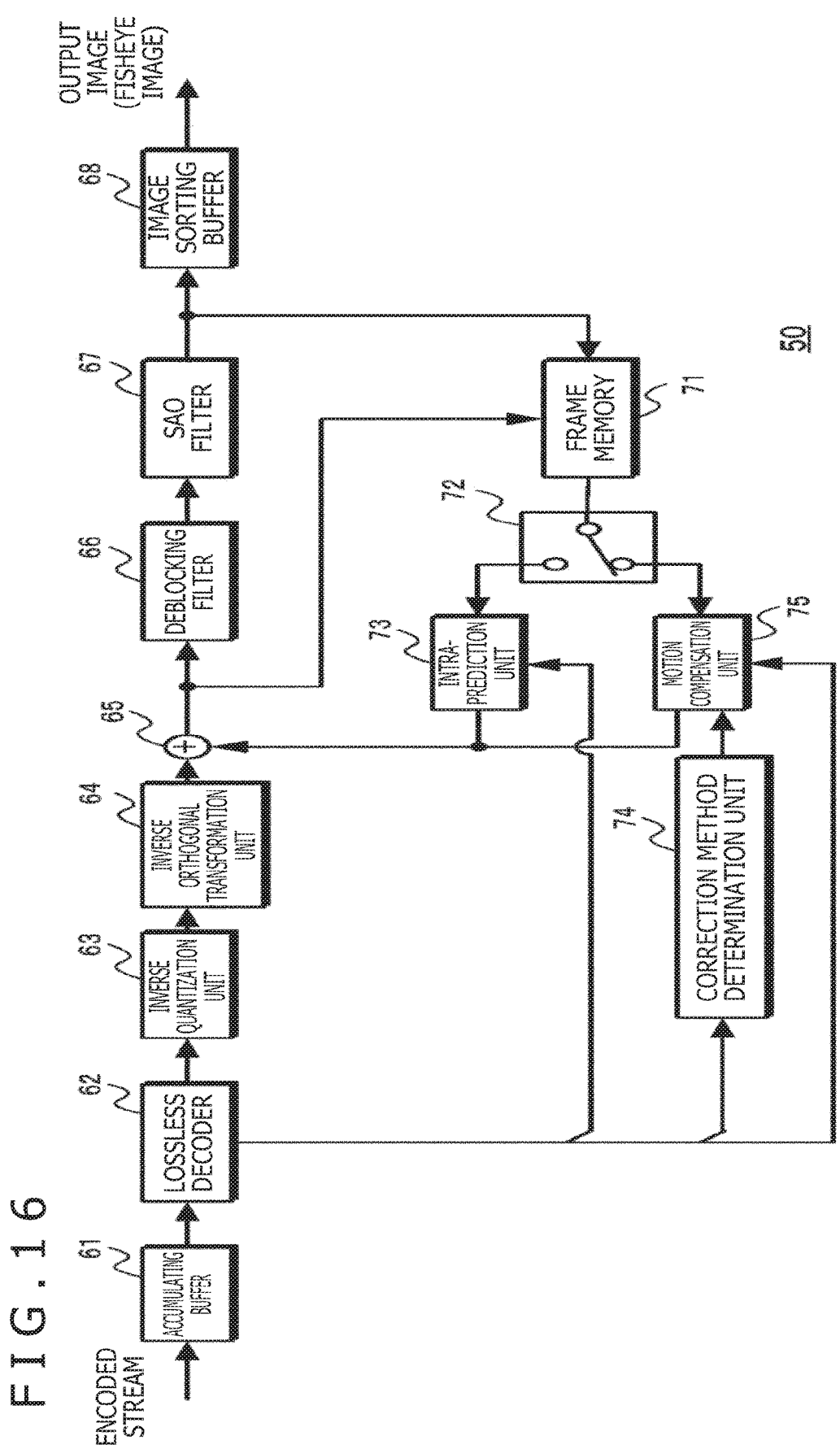
FIG. 16 is a diagram illustrating a configuration of an image decoding device.

FIG. 16 illustrates a configuration of an image decoding device that performs decoding processing on the encoded stream of the fisheye image, and the image decoding device 50 is an image decoding device corresponding to the image encoding device 10 illustrated in FIG. 1. The encoded stream generated by the image encoding device 10 is supplied to the image decoding device 50 to be decoded.

The image decoding device 50 includes an accumulating buffer 61, a lossless decoder 62, an inverse quantization unit 63, an inverse orthogonal transformation unit 64, an operator 65, a deblocking filter 66, an SAO filter 67, and an image sorting buffer 68. In addition, the image decoding device 50 includes a frame memory 71, a selector 72, an intra-prediction unit 73, a correction method determination unit 74, and a motion compensation unit 75.

The accumulating buffer 61 receives and accumulates the transmitted encoded stream. This encoded stream is read at predetermined timing to be output to the lossless decoder 62.

The lossless decoder 62 performs lossless decoding on the encoded stream, outputs parameters such as information indicating the intra-prediction mode or the inter-prediction mode and the fisheye information thus obtained to the intra-prediction unit 73, and outputs the parameters such as information indicating the inter-prediction mode and motion vector information to the motion compensation unit 75. Further, the lossless decoder 62 performs the lossless decoding on the encoded stream and outputs the obtained fisheye information to the correction method determination unit 74.

The inverse quantization unit 63 performs inverse quantization on the quantized data obtained by being decoded by the lossless decoder 62 with a method corresponding to the quantization method of the quantization unit 24 in FIG. 1. The inverse quantization unit 63 outputs the inversely quantized data to the inverse orthogonal transformation unit 64.

The inverse orthogonal transformation unit 64 performs inverse orthogonal transformation with a method corresponding to the orthogonal transformation method of the orthogonal transformation unit 23 in FIG. 1, obtains decoded residue data corresponding to the residue data before the orthogonal transformation in the image encoding device 10, and outputs the decoded residue data to the operator 65.

The intra-prediction unit 73 or the motion compensation unit 75 supplies its predicted image data to the operator 65. The operator 65 adds the decoded residue data to the predicted image data, and obtains decoded image data corresponding to the original image data before the predicted image data is subtracted by the operator 22 in the image encoding device 10. The operator 65 outputs the decoded image data to the deblocking filter 66.

The deblocking filter 66 performs deblocking filtering processing to remove block distortion in the decoded image. The deblocking filter 66 outputs image data after the filtering processing to the SAO filter 67.

The SAO filter 67 performs SAO processing on the image data after the filtering performed by the deblocking filter 66. The SAO filter 67 uses the parameters supplied from the lossless decoder 62 to perform filtering processing on the image data after the filtering performed by the deblocking filter 66 for each LCU, and outputs the resultant image data to the image sorting buffer 68.

The image sorting buffer 68 sorts images. In other words, the image sorting buffer 68 sorts the images such that order of frames sorted into encoding order by the image sorting buffer 21 in FIG. 1 is sorted into the original display order.

The output of the SAO filter 67 is further supplied to the frame memory 71. The selector 72 reads image data to be used for the intra-prediction from the frame memory 71, and outputs the image data to the intra-prediction unit 73. Further, the selector 72 reads image data to be subjected to the inter-processing and image data to be referred from the frame memory 71, and outputs the image data to the motion compensation unit 75.

The lossless decoder 62 supplies information obtained by decoding the header information (e.g., the prediction mode information and the motion vector information) to the intra-prediction unit 73. In a case where the information from the lossless decoder 62 indicates that the prediction mode is the intra-prediction, the intra-prediction unit 73 generates predicted image data from the image data obtained from the frame memory 71, on the basis of, for example, the prediction mode information, and outputs the predicted image data to the operator 65.

On the basis of the fisheye information supplied from the lossless decoder 62, the correction method determination unit 74 outputs the correction factor table corresponding to the fisheye lens used to obtain the fisheye image to the motion compensation unit 75. Note that the correction method determination unit 74 and the motion compensation unit 75 configure a motion vector correction unit.

The lossless decoder 62 supplies information obtained by decoding the header information to the motion compensation unit 75. In a case where the information from the lossless decoder 62 indicates that the prediction mode is the inter-prediction, the motion compensation unit 75 generates predicted image data from the image data obtained from the frame memory 71, on the basis of, for example, the prediction mode information, motion information, and reference frame information, and outputs the predicted image data to the operator 65. Further, in a case where the encoded image is the fisheye image, and the predicted image data is generated, the motion compensation unit 75 uses the correction factor table generated by the correction method determination unit 74, and performs the scaling processing on a motion vector used to calculate the predictive motion vector of the current predictive block, similar to the inter-prediction unit 42 in the image encoding device 10. The motion compensation unit 75 performs motion compensation using the motion vector of the current predictive block calculated using the motion vector after the scaling processing to generate the predicted image data.

5. Operation of Image Decoding Device

Figure 17:
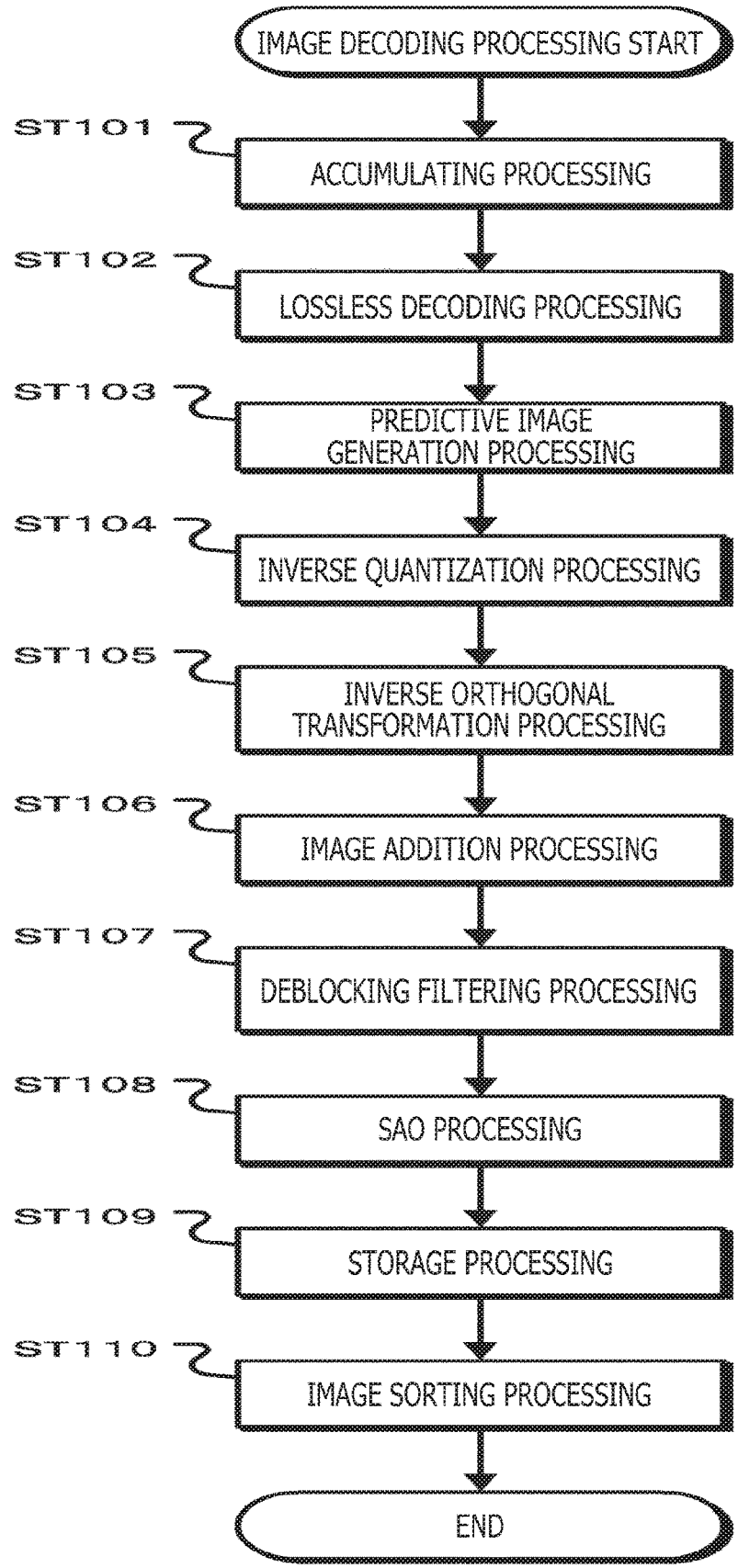
FIG. 17 is a flowchart illustrating an operation of the image decoding device.

Next, an operation of the exemplary embodiment of the image decoding device will be described. FIG. 17 is a flowchart illustrating the operation of the image decoding device.

When the decoding processing is started, the image decoding device performs accumulating processing in step ST101. The accumulating buffer 61 in the image decoding device 50 receives and accumulates the transmitted encoded stream.

The image decoding device performs the lossless decoding processing in step ST102. The lossless decoder 62 in the image decoding device 50 decodes the encoded stream supplied from the accumulating buffer 61. The lossless decoder 62 decodes parameter information such as the motion vector information, the reference frame information, the prediction mode information (the intra-prediction mode or the inter-prediction mode), and the fisheye information, prior to the decoding of the picture. In a case where the prediction mode information is the intra-prediction mode information, the prediction mode information and the fisheye image information are supplied to the intra-prediction unit 73. In a case where the prediction mode information is the inter-prediction mode information, the prediction mode information, corresponding motion vector information, and the like are output to the motion compensation unit 75.

Further, the fisheye information is output to the correction method determination unit 74.

The image decoding device performs predicted image generation processing in step ST103. The intra-prediction unit 73 or the motion compensation unit 75 in the image decoding device 50 performs the predicted image generation processing corresponding to the prediction mode information supplied from the lossless decoder 62.

In other words, in a case where the lossless decoder 62 supplies the intra-prediction mode information, the intra-prediction unit 73 generates intra-predicted image data in the intra-prediction mode. In a case where the lossless decoder 62 supplies the inter-prediction mode information, the motion compensation unit 75 performs the motion compensation processing in the inter-prediction mode to generate inter-predicted image data. Further, the motion compensation unit 75 performs, for example, the scaling processing on the motion vector using the correction factor table corresponding to the fisheye lens used to obtain the fisheye image, which is supplied from the correction method determination unit 74, and generates the predicted image data. The predicted image data generated by the intra-prediction unit 73 or the predicted image data generated by the motion compensation unit 75 is output to the operator 65.

The image decoding device performs the inverse quantization processing in step ST104. The inverse quantization unit 63 in the image decoding device 50 performs inverse quantization on the quantized data obtained by the lossless decoder 62 with a method corresponding to the quantization method of the quantization unit 24 in FIG. 1, and outputs the inversely quantized data to the inverse orthogonal transformation unit 64.

The image decoding device performs the inverse orthogonal transformation processing in step ST105. The inverse orthogonal transformation unit 64 in the image decoding device 50 performs the inverse orthogonal transformation with a method corresponding to the orthogonal transformation method of the orthogonal transformation unit 23 in FIG. 1, obtains decoded residue data corresponding to the residue data before the orthogonal transformation in the image encoding device 10, and outputs the decoded residue data to the operator 65.

The image decoding device performs image addition processing in step ST106. The operator 65 in the image decoding device 50 adds the predicted image data supplied from the intra-prediction unit 73 or the motion compensation unit 75 to the decoded residue data supplied from the inverse orthogonal transformation unit 64 to generate the decoded image data. The operator 65 outputs the generated decoded image data to the deblocking filter 66 and the frame memory 71.

The image decoding device performs deblocking filtering processing in step ST107. The deblocking filter 66 in the image decoding device 50 performs the deblocking filtering processing on the image output from the operator 65. This removes the block distortion. The decoded image from the deblocking filter 66 is output to the SAO filter 67.

The image decoding device performs SAO processing in step ST108. The SAO filter 67 in the image decoding device 50 performs the SAO processing on the image after filtering performed by the deblocking filter 66 using the parameters regarding the SAO processing supplied from the lossless decoder 62. The SAO filter 67 outputs the decoded image data after the SAO processing to the image sorting buffer 68 and the frame memory 71.

The image decoding device performs storage processing in step ST109. The frame memory 71 in the image decoding device 50 stores the decoded image data before the filtering processing, which is supplied from the operator 65, and the decoded image data that is subjected to the filtering processing performed by the deblocking filter 66 and the SAO filter 67.

The image decoding device performs image sorting processing in step ST110. The image sorting buffer 68 in the image decoding device 50 accumulates the decoded image data supplied from the SAO filter 67, and outputs the accumulated decoded image data in the display order before the image sorting buffer 21 in the image encoding device 10 sorts the decoded image data.

When such decoding processing is performed, the encoded stream generated by the above-described image encoding device 10 can be decoded, and the fisheye image generated by the image encoding device 10 can be output from the image decoding device 50.

6. Another Configuration of Image Processing Device

The image processing device may be configured to perform the encoding/decoding processing of the normal image similar to conventional one and the encoding/decoding processing of the above-described fisheye image. In this case, identification information indicating whether a target of the encoding/decoding processing is the normal image or the fisheye image, for example, a flag (hereinafter, referred to as a "fisheye flag FEfg") is used.

For example, in a case where the fisheye flag FEfg satisfies "FEfg=1," the above-described encoding/decoding processing is performed using the correction factor table. In contrast, in a case where the fisheye flag FEfg satisfies "FEfg=0," the conventional encoding/decoding processing is performed without using the correction factor table. Further, in a case where the fisheye flag FEfg is not provided, similar to the case of "FEfg=0," the encoding/decoding processing is performed without using the correction factor table.

In this case, the fisheye information includes the fisheye flag FEfg in addition to the information indicating the projection method and the information indicating the fisheye radius, which are described above. The information indicating the projection method and the information indicating the fisheye radius become effective in a case where the fisheye flag FEfg satisfies "FEfg=1."

The information indicating the projection method can identify four projection methods illustrated in FIGS. 2A, 2B, 2C, 2D, and 2E by, for example, values "0" to "3."

The information indicating the fisheye radius indicates a length of the radius. When the length of the radius is indicated in such a manner, even in a case where the circular fisheye image does not touch an image border, the above-described processing can be performed. This eliminates necessity for regulating a shooting method such that the circular fisheye image touches the image border, whereby a degree of freedom when the fisheye image is obtained can be made high.

Furthermore, the fisheye information may include lens type information indicating whether the circumferential fisheye or the diagonal-line fisheye illustrated in FIGS. 12A and 12B are used. The circumferential fisheye and the diagonal-line fisheye can be identified by values "0" and "1," for example. The lens type information becomes effective in a case where the fisheye flag FEfg satisfies "FEfg=1." When the fisheye information includes this lens type information, the fisheye radius R can be calculated after a size of the picture is determined. Further, when the lens type information and the picture size are determined upon encoding, the fisheye radius R can be calculated. For example, in a case where the circumferential fisheye is used, the fisheye radius R is ½ times a length of a short side of the picture. Further, in a case where the diagonal-line fisheye is used, the fisheye radius R is ½ times a length of a diagonal line of the picture. Note that, upon decoding, the fisheye radius needs to be calculated. Further, in a case where the circular fisheye image does not touch the image border of the picture, such as a case where the fisheye radius R is shorter than ½ times the length of the short side of the picture, or a case where the fisheye radius R is longer than ½ times the length of the diagonal line, the fisheye radius R cannot be calculated. However, in a case where the lens type is limited to any one of the circumferential fisheye and the diagonal-line fisheye, when the fisheye information is caused to include the lens type information instead of the fisheye radius, the lens type information can be smaller in data amount than information indicating the fisheye radius. This can enhance encoding efficiency.

According to such an image processing device of the present technology, compatibility with the conventional image processing device, that is, a device for encoding and decoding the image obtained using the normal lens of the central projection method can be maintained.

7. Application Examples

Next, application examples of the image processing device of the present technology will be described. The image processing device of the present technology can be applied to a shooting device that shoots a moving image using the fisheye lens, for example. In this case, when the image encoding device 10 is provided in the shooting device, it is possible to efficiently encode the fisheye image, and to record the encoded stream to a recording medium or output the encoded stream to an external device. Further, when the image decoding device 50 is provided in the shooting device, it is possible to decode the encoded stream, and to record and reproduce the fisheye image. In addition, when the shooting device provided with the image encoding device 10 is mounted on any type of a moving body such as an automobile, an electric vehicle, a hybrid electric vehicle, a motorcycle, a bicycle, a personal mobility, an airplane, a drone, a ship, a robot, a construction machine, and an agricultural machine (tractor), an entire image around a periphery of the moving body can efficiently be recorded or transmitted to an external apparatus. Furthermore, when the image processing device of the present technology is provided in a portable electronic apparatus having a function for shooting a moving image using a fisheye lens, a data amount can be reduced in comparison with a conventional device upon recording the fisheye image into a recording medium.

In addition, when the image processing device that performs decoding processing is provided in an image reproducing device, a celestial sphere image can be displayed with, for example, a head-mounting display.

A series of processing described in the specification can be performed by hardware, software, or a combined configuration of hardware and software. In a case where processing by software is performed, a program recording a processing sequence is installed in a memory in a computer embedded in dedicated hardware to be executed. Alternatively, the program can be installed in a general-purpose computer capable of performing various kinds of processing to be executed.

For example, the program can be recorded in advance in a hard disk, an SSD (Solid State Drive), a ROM (Read Only Memory) each of which serves as a recording medium. Alternatively, the program can temporarily or permanently be stored (recorded) in a removable recording medium such as a flexible disc, a CD-ROM (Compact Disk Read Only Memory), an MO (Magneto optical) disc, a DVD (Digital Versatile Disc), a BD (Blu-Ray Disc (registered trademark)), a magnetic disc, and a semiconductor memory card. Such a removable recording medium can be provided as what is generally called package software.

The program may wirelessly or wiredly be transferred from a download site to a computer via a network such as a LAN (Local Area Network) or the Internet, other than being installed from the removable recording medium to the computer. The computer can receive the program transferred in such a manner, and install the program in a built-in recording medium such as the hard disk.

Note that effects described in the present specification are illustrative in nature and are not limited, and may include additional effects that are not described here. Furthermore, the present technology should not be construed while being limited to the exemplary embodiment of the above-described technology. It is obvious that the exemplary embodiment of this technology discloses the present technology in a form of illustration, and modifications or substitutions of the exemplary embodiment can be made by those skilled in the art in a range without departing from the gist of the present technology. In other words, in order to determine the gist of the present technology, the claims should be taken in consideration.

Furthermore, the image processing device of the present technology can adopt the following configurations.

(1)

An image processing device including:

a motion vector correction unit that performs scaling processing on a motion vector used to calculate a predictive motion vector of a current predictive block in a fisheye image shot using a fisheye lens, on the basis of fisheye information regarding the fisheye lens and the fisheye image.

(2)

The image processing device according to the item (1), in which the motion vector correction unit performs the scaling processing on the motion vector, on the basis of a projection method of the fisheye lens and a radius of the fisheye image.

(3)

The image processing device according to the item (2), in which the motion vector correction unit performs the scaling processing on the motion vector using a correction factor that corrects fisheye distortion that varies according to a distance from a center of the fisheye lens.

(4)

The image processing device according to the item (3), in which the motion vector correction unit performs scaling by transforming the motion vector in the fisheye image to a motion vector in an image having no fisheye distortion using the correction factor and the radius of the fisheye image, and transforms the motion vector after the scaling to the motion vector in the fisheye image.

(5)

The image processing device according to the item (3) or (4), in which the motion vector correction unit performs the scaling processing using a correction factor table corresponding to the fisheye lens used to shoot, from correction factor tables for respective projection methods of the fisheye lens, each of the correction factor tables indicating the correction factor that is normalized.

(6)

The image processing device according to the item (5), in which the motion vector correction unit retains the correction factor tables for the respective projection methods in advance.

(7)

The image processing device according to any one of the items (3) to (5), in which the correction factor is calculated, on the basis of a characteristic formula of the projection method of the fisheye lens and a characteristic formula of a central projection method for obtaining the image having no fisheye distortion.

(8)

The image processing device according to any one of the items (1) to (7), in which the motion vector used to calculate the predictive motion vector is a motion vector of a peripheral block of the current predictive block.

(9)

The image processing device according to any one of the items (1) to (8), further including:

a lossless encoder that incorporates fisheye information regarding the fisheye lens used to shoot, into an encoded stream of the fisheye image.

(10)

The image processing device according to the item (9), in which the lossless encoder incorporates information indicating whether or not the scaling processing is performed, into the encoded stream.

(11)

The image processing device according to the item (9) or (10), in which the fisheye information includes information indicating a projection method of the fisheye lens and information indicating a radius of the fisheye image.

(12)

The image processing device according to the item (11), in which the fisheye information includes information indicating a projection method of an optical image, instead of the information indicating the radius of the fisheye image.

(13)

The image processing device according to any one of the items (1) to (8), further including:

a lossless decoder that decodes the encoded stream of the fisheye image, in which the motion vector correction unit performs the scaling processing using fisheye information regarding the fisheye lens used to shoot, the fisheye information being obtained by decoding the encoded stream by the lossless decoder.

(14)

The image processing device according to the item (13), in which, in a case where the information obtained by decoding the encoded stream by the lossless decoder indicates that the scaling processing is to be performed, the motion vector correction unit performs the scaling processing using the fisheye information.

INDUSTRIAL APPLICABILITY

According to an image processing device and an image processing method of the present technology, a motion vector used to calculate a predictive motion vector of a current predictive block in a fisheye image shot using a fisheye lens is subjected to scaling processing based on fisheye information regarding the fisheye lens and the fisheye image. Therefore, encoding processing or decoding processing of the fisheye image can be performed with encoding efficiency higher than a case where the scaling processing is not performed. Accordingly, the present technology is suitable for, for example, an electronic apparatus and a moving body device that perform, for example, recording, reproducing, and transmitting the fisheye image.

REFERENCE SIGNS LIST

10 ・・・ Image encoding device
21, 68 ・・・ Image sorting buffer
22, 33, 65 ・・・ Operator
23 ・・・ Orthogonal transformation unit
24 ・・・ Quantization unit
25 ・・・ Lossless encoder
26 ・・・ Accumulating buffer
27 ・・・ Rate controller
31, 63 ・・・ Inverse quantization unit
32, 64 ・・・ Inverse orthogonal transformation unit
34, 66 ・・・ Deblocking filter
35, 67 ・・・ SAO filter
36, 71 ・・・ Frame memory
37, 72 ・・・ Selector
40, 74 ・・・ Correction method determination unit
41, 73 ・・・ Intra-prediction unit
42 ・・・ Inter-prediction unit
43 ・・・ Prediction selector
50 ・・・ Image decoding device
61 ・・・ Accumulating buffer
62 ・・・ Lossless decoder
75 ・・・ Motion compensation unit

The invention claimed is:

1. An image processing device, comprising:
circuitry configured to perform, in an inter-prediction processing included in an encoding processing of a fisheye image shot using a fisheye lens, a scaling processing on a first motion vector in the fisheye image on a basis of a projection method of the fisheye lens and a radius of the fisheye image, wherein
the first motion vector is a parameter for the inter-prediction processing to calculate a predictive motion vector of a current predictive block.

2. The image processing device according to claim 1, wherein
the circuitry is configured to:
generate, on a basis of the projection method of the fisheye lens and the radius of the fisheye image, a correction factor that corrects a fisheye distortion that varies according to a distance from a center of the fisheye lens; and
perform the scaling processing on the first motion vector using the correction factor.

3. The image processing device according to claim 2, wherein
the circuitry is configured to:
perform scaling by transforming the first motion vector in the fisheye image to a second motion vector in an image having no fisheye distortion using the correction factor and the radius of the fisheye image; and
transform the second motion vector, after the scaling, to the first motion vector in the fisheye image.

4. The image processing device according to claim 2, wherein
the circuitry is configured to perform the scaling processing using a correction factor table corresponding to the fisheye lens, from a plurality of correction factor tables for respective projection methods of the fisheye lens, and
each correction factor table of the plurality of correction factor tables indicating the correction factor that is normalized.

5. The image processing device according to claim 4, wherein
the circuitry is configured to retain the plurality of correction factor tables for the respective projection methods in advance.

6. The image processing device according to claim 2, wherein
the correction factor is calculated on a basis of a characteristic formula of the projection method of the fisheye lens and a characteristic formula of a central projection method for obtaining an image having no fisheye distortion.

7. The image processing device according to claim 1, wherein
the first motion vector used to calculate the predictive motion vector is a motion vector of a peripheral block of the current predictive block.

8. The image processing device according to claim 1, further comprising:
a lossless encoder configured to incorporate the projection method of the fisheye lens and the radius of the fisheye image into an encoded stream of the fisheye image.

9. The image processing device according to claim 8, wherein
the lossless encoder is configured to incorporate information, indicating-whether or not the scaling processing is performed, into the encoded stream.

10. The image processing device according to claim 8, wherein
the lossless encoder is configured to incorporate information indicating a projection method of an optical image, instead of information indicating the radius of the fisheye image.

11. The image processing device according to claim 1, further comprising:
a lossless decoder configured to decode an encoded stream of the fisheye image, wherein
the circuitry is configured to perform the scaling processing using the projection method of the fisheye lens and the radius of the fisheye image, and
the projection method of the fisheye lens and the radius of the fisheye image are obtained by decoding the encoded stream by the lossless decoder.

12. The image processing device according to claim 11, wherein,
in a case where the projection method of the fisheye lens and the radius of the fisheye image obtained by decoding the encoded stream by the lossless decoder indicate that the scaling processing is to be performed, the circuitry is configured to perform the scaling processing using the projection method of the fisheye lens and the radius of the fisheye image.

13. An image processing method, comprising:
performing, in an inter-prediction processing included in an encoding processing of a fisheye image shot using a fisheye lens, a scaling processing on a motion vector in the fisheye image on a basis of a projection method of the fisheye lens and a radius of the fisheye image, wherein
the motion vector is a parameter for the inter-prediction processing to calculate a predictive motion vector of a current predictive block.

* * * * *